(12) United States Patent
Pilavdzic

(10) Patent No.: US 7,714,257 B2
(45) Date of Patent: May 11, 2010

(54) ELECTRICAL CONNECTOR ASSEMBLY FOR AN ARCUATE SURFACE IN A HIGH TEMPERATURE ENVIRONMENT AND AN ASSOCIATED METHOD OF USE

(75) Inventor: Jim Pilavdzic, Milton, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 1258 days.

(21) Appl. No.: 11/241,135

(22) Filed: Sep. 30, 2005

(65) Prior Publication Data

US 2007/0077821 A1    Apr. 5, 2007

(51) Int. Cl.
*H05B 3/08* (2006.01)
*H01R 43/00* (2006.01)

(52) U.S. Cl. ............... 219/541; 29/854; 29/877; 29/876; 439/620.21

(58) Field of Classification Search ............... 219/541; 439/620.21; 29/854, 877, 876
See application file for complete search history.

(56) References Cited

U.S. PATENT DOCUMENTS

| | | | |
|---|---|---|---|
| 4,108,522 A | 8/1978 | Favale | |
| 4,810,201 A | 3/1989 | Mendez et al. | |
| 5,147,215 A | 9/1992 | Pritulsky | |
| 5,266,023 A | 11/1993 | Renwick | |
| 5,352,109 A | 10/1994 | Benenati | |
| 5,417,583 A | 5/1995 | Ishizaki et al. | |
| 5,422,457 A | 6/1995 | Tang et al. | |
| 6,039,238 A | 3/2000 | Panaghe | |
| 6,325,615 B1 | 12/2001 | Johnson et al. | |
| 6,410,894 B1 | 6/2002 | Hoffmann et al. | |
| 6,433,319 B1 | 8/2002 | Bullock et al. | |
| 6,530,776 B1 * | 3/2003 | Pilavdzic et al. | ............ 425/549 |
| 2004/0258793 A1 | 12/2004 | Sicilia et al. | |

FOREIGN PATENT DOCUMENTS

| | | |
|---|---|---|
| CA | 2167347 | 6/1999 |
| CA | 2078180 | 1/2000 |
| WO | 0198055 | 12/2001 |
| WO | 02070226 | 9/2002 |

OTHER PUBLICATIONS

International Search Report for PCT/CA2006001265, dated Nov. 1, 2006, five pages, related to the above-identified US patent application.

* cited by examiner

*Primary Examiner*—Shawntina Fuqua
(74) *Attorney, Agent, or Firm*—Husky Intellectual Property Services

(57) ABSTRACT

An electrical connector assembly for an arcuate surface in a high temperature environment and associated method of use is disclosed for a variety of applications. This can include, but is not limited to, an injection molding heater assembly having at least one heater and an injection molding heater and nozzle assembly having at least one heater and a nozzle that is in thermal communication with the at least one heater. This at least one electrical connector, having a first electrical conductor that is electrically connectable to at least one first conductive portion on at least one arcuate surface and a second electrical conductor that is electrically connectable to at least one second conductive portion on the at least one arcuate surface, and at least one disconnect mechanism positioned adjacent to the at least one electrical connector and in electrical connection with the first electrical conductor and the second electrical conductor.

39 Claims, 23 Drawing Sheets

ELECTRICAL CONNECTOR ASSEMBLY FOR AN ARCUATE SURFACE IN A HIGH TEMPERATURE ENVIRONMENT AND AN ASSOCIATED METHOD OF USE

TECHNICAL FIELD OF THE INVENTION

The present invention relates to an electrical connector assembly, and more specifically to an electrical connector having a disconnect mechanism for an arcuate surface in a high temperature environment and an associated method of use.

BACKGROUND OF THE INVENTION

Various articles and methods of forming electrical connections are well known including soldering, spring-loaded contact pads, welding or the use of electrically conductive epoxy adhesives. However, there are problems in forming a suitably reliable electrical connection between a wire conductor and a terminal pad which is deposited on a substrate such as metal, steel, ceramic, or a substrate comprising one or more metal, steel or ceramic components or layers that are placed in high temperature environments. Unfortunately, most of these well known articles and methods for attaching a wire have an upper temperature limit beyond which the original physical characteristics become unstable so that the electrical connections so formed are incapable of reliably maintaining their attachment integrity over a wide temperature range.

For example, specialized solder is effective up to 280 degrees Celsius at which point the solder will melt and allow the wire to disconnect from the pad. In addition, the application and processing of specialized solder is time consuming. Silver epoxy is also used but silver-loaded epoxy is effective up to 250 degrees Celsius and is expensive and time consuming to process. The use of glass-loaded epoxy extends the temperature range up to 400 degrees Celsius but is also very expensive, time consuming and may contain lead or lead-based alloys. In extremely high temperature environments, spring loaded contacts mounted directly on the arcuate surface have been employed but they are very complicated, time consuming and have a limited operating life. In addition, the integrity of the spring contact reduces with age due to thermal cycling and accelerated oxidation. The integrity of a contact pad will deteriorate fast due to contact bouncing phenomenon and the soft material utilized with a pad.

Other more conventional methods of attachment such as an electric arc or flame-burner welding, narrow gap welding, plasma gap welding, plasma/laser welding, have also been employed, but these are not easily adaptable for film terminal pads on a glass loaded ceramic substrate, a ceramic-based substrate, or a coated substrate.

U.S. Pat. No. 6,039,238, issued to Panaghe, discloses a method of attaching a conductor to a thick film trace by applying pressure to a terminal lug that is affixed to the conductor and ultrasonically welding the terminal lug to the film trace. However, this method is problematic and does not address every installation scenario. For example, a means for applying this method to an arcuate (e.g., cylindrical) substrate is not addressed or contemplated. Furthermore, this method also requires the attachment of a terminal lug to the proximal end of the conductor/wire which can be expensive and problematic. Yet another shortcoming of this device is the requirement that the thick film pad be substantially the same thickness as the terminal lug. This would require either the use of a terminal lug that is very thin or a thick film pad that is very thick.

U.S. Pat. No. 5,422,457, issued to Tang et al., discloses a soldering iron with a separable plug and socket connector so that the heater can be exchanged without an accidental disconnection of the soldering assembly. However, since the temperature at the socket connector is relatively low, it does not address the issue of an electrical connection in a high temperature environment.

U.S. Pat. No. 5,352,109, issued to Benenati, discloses an injection molding apparatus that has an injection nozzle with cartridge heaters in grooves that extend axially along the outside of the nozzle. The heaters are retained in grooves by spring "C" clips. A drawback to this system is that it requires the use of liquid-filled channels or highly conductive metal rods to equalize the temperature of the nozzle from one extremity to another.

U.S. Pat. No. 6,325,615, issued to Johnson et al., discloses a wire electrical connector assembly for removably connecting two wire ends to facilitate replacement of a nozzle heater in a mold. The interconnect is located away from the heater so that it is not subject to high temperature environment. This reference does address the problem of being able to rectify a wiring failure without replacing the entire heater as well as the wiring problems that occur in the connection between the wiring and the nozzle heater in a high temperature environment.

U.S. Pat. No. 6,410,894, issued to Hoffmann et al., discloses an electric heater with a tubular substrate. There is a thick film resistive heating element that is disposed about the tubular substrate and there is a metallic overcoat that encases at least a termination portion of the heating element between the substrate and the metallic overcoat. This reference does not address the issue of removing defective wiring that is directly attached to a nozzle heater in a high temperature environment and is only marginally relevant in that it discloses axially aligned wiring.

U.S. Pat. No. 6,433,319, issued to Bullock et al., discloses a clamping mechanism for attaching a stranded conductor to a conductive coating on a substrate. It does not address the wiring problems that occur in the connection between the wiring and the arcuate substrate in a high temperature environment.

Finally, U.S. Pat. No. 6,530,776, issued to Pilavdzic et al., discloses a current method of attaching a conductor to a thick/thin film pad for a heater that is in thermal communication with an injection nozzle. There are a number of densified electrical connectors connected to a film pad with ultrasonic welding. This reference highlights the problems by showing the amount of work involved to attach the conductors to a thick pad and how difficult it would be to remove them or sever this connection without providing a suggestion regarding what to do if the heater or power supply wire fails other than the replacement of the entire heater.

Therefore, the prior art does not provide a satisfactory connector in a high temperature environment that can be readily separated from the power supply when the heater fails in order to reduce overall machine downtime and therefore, increase efficiency and uptime of the molding system. Having to physically handle the arcuate substrate can damage both the device, e.g., heater, as well as the associated wiring connected to the arcuate substrate. In the prior state of technology, the nature of the pad and the associated methods of attachment make it impossible to re-work arcuate substrate connections by any specific means. Also, it can be very time consuming to disconnect the wiring from the arcuate substrate and reconnect wiring to another arcuate substrate. This can result in significant efficiency loss and associated down time.

There is a need for a reliable connector that can facilitate replacement of the heater or power wiring to provide easy electrical attachment and disengagement of the power supply wires in a high temperature environment. The present invention is directed to overcoming one or more of the problems set forth above.

SUMMARY OF INVENTION

In one aspect of this invention, an electrical connector assembly is disclosed. This electrical connector assembly can be optionally utilized with a heater and this electrical connector assembly can be optionally utilized with at least one heater in thermal communication with at least one nozzle. This electrical connector assembly includes at least one electrical connector, having a first electrical conductor that is electrically connectable to at least one first conductive portion on at least one arcuate surface and a second electrical conductor that is electrically connectable to at least one second conductive portion on the at least one arcuate surface, and at least one disconnect mechanism positioned adjacent to the at least one electrical connector and in electrical connection with the first electrical conductor and the second electrical conductor.

In another aspect of this invention, an electrical connector assembly is disclosed. This electrical connector assembly can be optionally utilized with a heater and this electrical connector assembly can be optionally utilized with at least one heater in thermal communication with at least one nozzle. This electrical connector assembly includes at least one electrical connector, having a first electrical conductor that is electrically connectable to at least one first thick/thin (layered) film pad on a heater in thermal communication with an injection molding nozzle and a second electrical conductor that is electrically connectable to the at least one second film pad on a heater in thermal communication with an injection molding nozzle, and at least one disconnect mechanism positioned adjacent to the electrical connector and in electrical connection with the first electrical conductor and the second electrical conductor; wherein the at least one disconnect mechanism includes at least one detachable electrical connector that can engage the first electrical conductor and provide an electrical connection to a third electrical conductor and the at least one detachable electrical connector that can engage the second electrical conductor and provide an electrical connection to a fourth electrical conductor placed in the same high temperature environment.

In yet another aspect of the invention, an electrical connector assembly is disclosed. This electrical connector assembly can be optionally utilized with a heater and this electrical connector assembly can be optionally utilized with at least one heater in thermal communication with at least one nozzle. This electrical connector assembly also includes at least one first contact blade that can be selectively positioned adjacent to the at least one first conductive portion on the arcuate surface of the heater and in electrical connection therewith and at least one second contact blade that can be positioned adjacent to the at least one second conductive portion on the arcuate surface of the heater and in electrical connection therewith and the at least one first contact blade is electrically connected to the first electrical conductor and the at least one second contact blade is electrically connected to the second electrical conductor.

In a further aspect of the invention, an electrical connector assembly is disclosed. This electrical connector assembly can be optionally utilized with a heater and this electrical connector assembly can be optionally utilized with at least one heater in thermal communication with at least one nozzle. This electrical connector assembly can be axially rotated so the at least one first contact blade that can be selectively positioned adjacent to the at least one first conductive portion on the arcuate surface of the heater and in electrical connection therewith and the at least one second contact blade can be positioned adjacent to the at least one second conductive portion on the arcuate surface of the heater and in electrical connection therewith and secured into a fixed position.

In still yet another aspect of the invention, an injection molding system, such as but not limited to a hot runner system, having at least one heater with an arcuate surface and a nozzle that is in thermal communication with the at least one heater with an electrical connector assembly is disclosed. The at least one first contact blade and the at least one second contact blade can be mounted within a housing and the housing may optionally include a plurality of rings.

In another aspect of the invention, an injection molding system, such as but not limited to a hot runner system, having at least one heater with an arcuate surface and a nozzle that is in thermal communication with the at least one heater with an electrical connector assembly is disclosed. This at least one heater is selected from the group consisting of at least two heaters joined together for an injection molding machine or at least two heaters linked together in series for an injection molding machine is disclosed.

Still another aspect of the invention, an electrical connector assembly is disclosed. This electrical connector assembly can be optionally utilized with a heater and this electrical connector assembly can be optionally utilized with at least one heater in thermal communication with at least one nozzle. This at least one electrical connector assembly includes a plurality of electrical connector assemblies each having at least one first contact blade that can be selectively positioned adjacent to the at least one first conductive portion on the arcuate surface of the heater and in electrical connection therewith and the plurality of electrical connector assemblies each having at least one second contact blade that can be positioned adjacent to the at least one second conductive portion on the arcuate surface of the heater and in electrical connection therewith and includes at least one electrical jumper assembly that provides electrical power to the plurality of first contact blades through the first electrical conductor and provides electrical power to the plurality of second contact blades through the second electrical conductor and further includes a plurality of electrical interconnections between a plurality of electrical connectors that are housed within the at least one electrical jumper assembly and the plurality of electrical connector assemblies, wherein the first electrical conductor is connected to a first power inlet and the second electrical conductor is connected to a second power inlet.

In yet another aspect of the present invention, an electrical connector assembly is disclosed. This electrical connector assembly can be optionally utilized with a heater and this electrical connector assembly can be optionally utilized with at least one heater in thermal communication with at least one nozzle. This electrical connector assembly includes at least one electrical connector, having a first electrical conductor that is electrically connectable to at least one first film pad on a heater in thermal communication with an injection molding nozzle and a second electrical conductor that is electrically connectable to the at least one second film pad on a heater in thermal communication with an injection molding nozzle, and at least one disconnect mechanism positioned adjacent to the electrical connector, wherein the at least one disconnect mechanism includes a receptacle that is electrically connected to the at least one first film pad on the heater in thermal communication with the injection molding nozzle and the at least one second film pad on the heater in thermal communication with the injection molding nozzle and the at least one disconnect mechanism includes an engagement member that is electrically connected to the first electrical conductor and the second electrical conductor, wherein the engagement member and the receptacle are selectively engageable to provide power from the first electrical conductor to the at least one first film pad on the heater in thermal communication with the injection molding nozzle and electrical power from the second electrical conductor to the at least one second film pad on the heater in thermal communication with the injection molding nozzle.

In yet another aspect of the present invention, an electrical connector assembly is disclosed. This electrical connector assembly can be optionally utilized with a heater and this electrical connector assembly can be optionally utilized with at least one heater in thermal communication with at least one nozzle. This electrical connector assembly includes at least one disconnect mechanism having a first contact for selective engagement of the first electrical conductor and a second contact for selective engagement of the second electrical conductor.

In another aspect of this invention, a method for utilizing an electrical connector assembly is disclosed. This electrical connector assembly can be optionally utilized with a heater and this electrical connector assembly can be optionally utilized with at least one heater in thermal communication with at least one nozzle. This method includes providing at least one disconnect mechanism positioned adjacent to at least one electrical connector, wherein the at least one electrical connector includes a first electrical conductor that is electrically connectable to at least one first conductive portion on the arcuate surface of the heater and a second electrical conductor that is electrically connectable to at least one second conductive portion on the arcuate surface of the heater.

In still another aspect of this invention, a method for utilizing an electrical connector assembly is disclosed. This electrical connector assembly can be optionally utilized with a heater and this electrical connector assembly can be optionally utilized with at least one heater in thermal communication with at least one nozzle. This method includes utilizing a plurality of connector assemblies each selectively positioning at least one first contact blade, of the at least one electrical connector, adjacent to the at least one first conductive portion on the arcuate surface of the heater and in electrical connection therewith and the at least one first contact blade is electrically connected to the first electrical conductor and wherein the plurality of connector assemblies each selectively positioning at least one second contact blade, of the at least one electrical connector, adjacent to the at least one second conductive portion on the arcuate surface of the heater and in electrical connection therewith and the at least one second contact blade is electrically connected to the second electrical conductor and includes providing at least one electrical jumper assembly that provides electrical power to the plurality of first contact blades through the first electrical conductor and provides electrical power to the plurality of second contact blades through the second electrical conductor and providing a plurality of electrical interconnections between a plurality of electrical connectors that are housed within the at least one electrical jumper assembly and the plurality of electrical connector assemblies, wherein the first electrical conductor is connected to a first power inlet and the second electrical conductor is connected to a second power inlet.

These are merely some of the innumerable aspects of the present invention and should not be deemed an all-inclusive listing of the innumerable aspects associated with the present invention. These and other aspects will become apparent to those skilled in the art in light of the following disclosure and accompanying drawings.

BRIEF DESCRIPTION OF DRAWINGS

For a better understanding of the present invention, reference may be made to the accompanying drawings in which.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as to obscure the present invention. For example, the invention can be applied to virtually any type of electrical connection to a curved or arcuate object in a high temperature environment.

Figure 1:
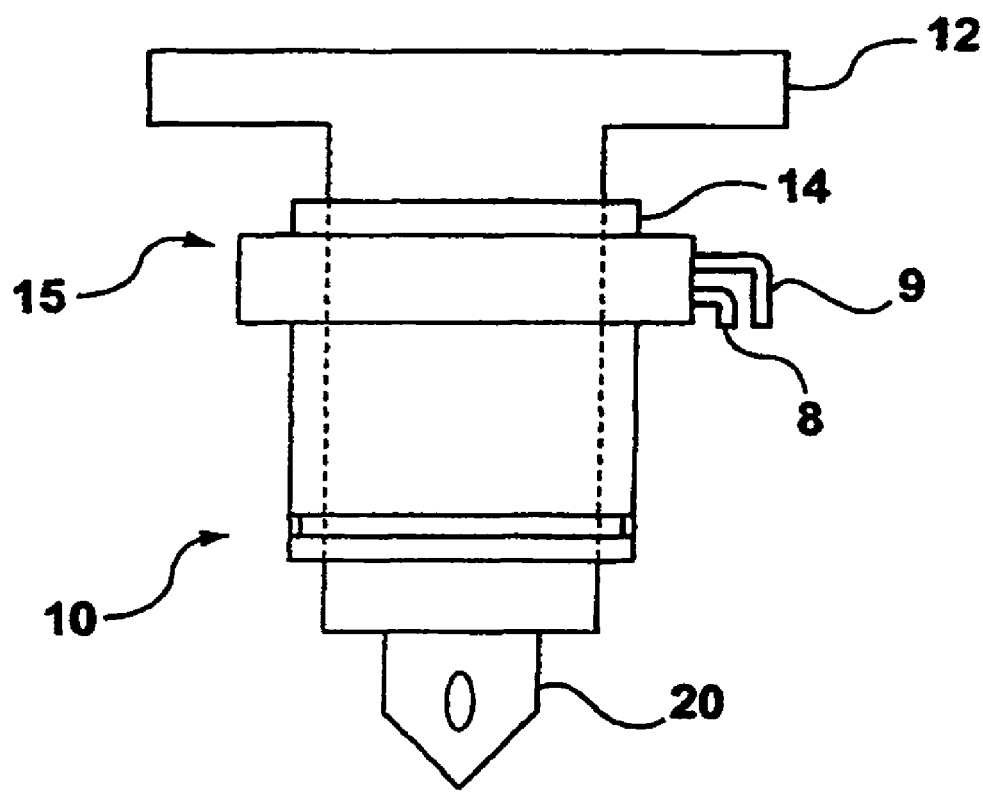
FIG. 1 is a simplified plan view of an injection molding nozzle and heater installed thereon.

Referring first to FIG. 1, which illustrates a typical injection molding nozzle 10 with a cylindrical heater 14 affixed thereon in accordance with one embodiment of the present invention. The cylindrical heater 14 may be placed in thermal communication with the nozzle body 12 in any number of well known ways, to keep molten plastic flowing inside the nozzle 10 at an elevated temperature. As is well known in the art, a nozzle tip 20 directs the heat flow towards a gate (not shown) and facilitates flow of molten material to a mold cavity (not shown).

The cylindrical heater 14 typically comprises a multi-layer device with a resistive or inductive trace for the generation of heat energy. There is at least one first electrical conductor 8 and at least one second electrical conductor 9 in electrical communication with cylindrical heater 14 for the application of electrical power. In this embodiment, an electrical connector 15 is placed around the cylindrical heater 14 and protects the contact area where the first electrical conductor 8 and the second electrical conductor 9 are affixed to the cylindrical heater 14.

In the alternative, the electrical connector 15 could be used in combination with the application of an insulative coat of thick film paste over the contact area. This coating would help produce a more robust and reliable connection. It can be noted, however, that one skilled in the art will quickly realize the possibility of numerous means for protecting the connection area. For example, metallic stamped parts could easily be fashioned to perform this function. The invention herein contemplates all such modifications.

Also, to further protect and seat the first electrical conductor 8 and the second electrical conductor 9 to the cylindrical heater 14, an optional potting material that is able to withstand elevated temperatures may be applied to the electrical connector 15 prior to their closure around the first electrical conductor 8 and the second electrical conductor 9. During testing, it was determined that a single part chemical-setting potting compound based on alumina can be utilized. This alumina-based potting compound has a temperature limit of 2,500 degrees Fahrenheit (1,371 degrees Celsius), a dielectric strength of 245 Volts/mil (9.65 Volts/mm) and a volume resistivity of 108 ohm-cm (42.52 ohm-inch). An illustrative, but nonlimiting, source of this alumina for this application can be found at Aremco Products, Inc. Aremco Products, Inc. has a place of business at 707-B Executive Blvd., Valley Cottage, N.Y. 10989.

In this arrangement, the electrical connector 15 provides for joint encapsulation, wire strain relief, and oxidation protection. An illustrative, but nonlimiting, example of the first electrical conductor 8 and the second electrical conductor 9 can include silver coated stranded copper wiring with appropriate high temperature electrical insulation. A nonlimiting source of wiring for this application can be purchased from Bay Associates. Bay Associates has a place of business at 150 Jefferson Drive, Menlo Park, Calif. 94025. An example of this type of first electrical conductor 8 and second electrical conductor 9 can be manufactured in accordance with MIL-W-16878/4.

Figure 2:
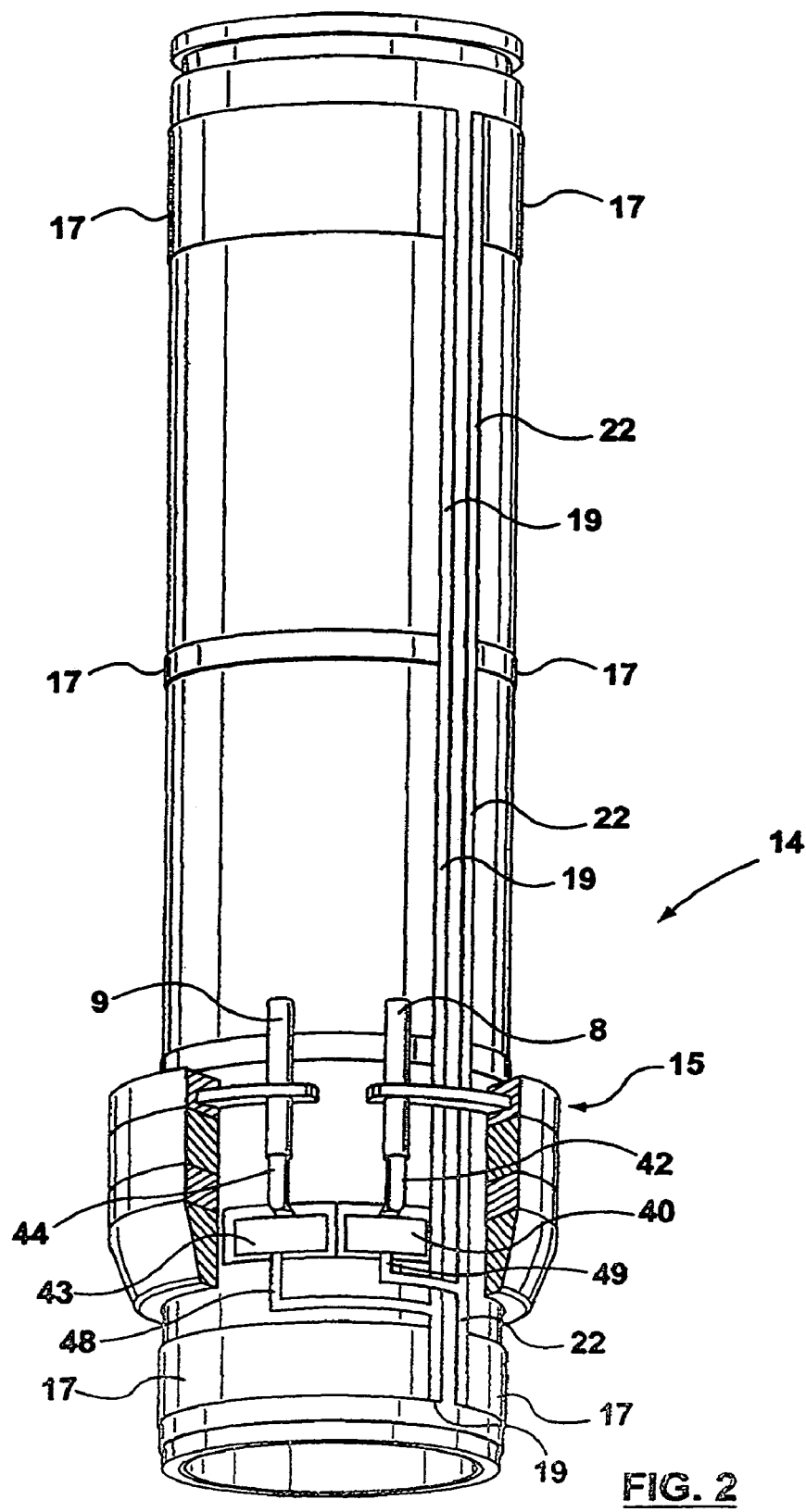
FIG. 2 is a perspective view of a first embodiment of an electrical connector for a cylindrical heater for an injection molding machine.

Referring now to FIG. 2, a simplified view of the cylindrical heater 14 having an electrical connector 15 is illustrated. The first electrical conductor 8 is electrically connected through a third electrical conductor 42. This third electrical conductor 42 is electrically attached to a first film pad 40 by a variety of methods, including but not limited to, brazing, laser and ultrasonic welding. Likewise, the second electrical conductor 9 is electrically connected through a fourth electrical conductor 44. This fourth electrical conductor 44 is electrically attached to a second film pad 43 by a variety of methods, including but not limited to, brazing, laser and ultrasonic welding. An illustrative example describing ultrasonic welding can be found in U.S. Pat. No. 6,530,776, issued to Pilavdzic et al., which is incorporated herein by reference. The pads referenced throughout are preferably thick pads; however, pads can include virtually any type of layered material and can range down to thin pads and any variation in between.

Disposed on the surface of the cylindrical heater 14 is at least one first conductive trace 19 which is in electrical communication through a fifth electrical conductor 48 from the second film pad 43. As previously stated, the second film pad 43 is electrically connected to the second electrical conductor 9 through a fourth electrical conductor 44. In addition, disposed on the surface of the cylindrical heater 14 is at least one second conductive trace 22, which is in electrical communication through a sixth electrical conductor 49 from the first film pad 40. As previously stated, the first film pad 40 is electrically connected to the first electrical conductor 8 through a third electrical conductor 42.

There is at least one resistive trace 17 that is electrically connected between the at least one first conductive trace 19 and the at least one second conductive trace 22. In the preferred embodiment, three resistive traces 17 are shown in FIG. 2. Therefore, when power is applied to the first electrical conductor 8 and the second electrical conductor 9, then power is applied to the first conductive trace 19 and the second conductive trace 22, it flows through the at least one resistive trace 17. This results in the generation of heat energy for the cylindrical heater 14. In a preferred embodiment, and not by limitation, the at least one first conductive trace 19 and the at least one second conductive trace 22 used in combination with the at least one resistive trace 17 provides precise control of the placement of heat energy for improved control over a heating process. The resistivity of film conductive and resistive materials is typically measured in the non-dimensional unit of ohms per square. An ohm per square is a measure of the sheet resistance, i.e., the resistance value of a thin layer of a semi-conductive material. Conductors will typically have values of 0.01 ohms/square and resistive materials are around 1 to 100,000 ohms/square. Resistance values can go into the Mega Ohms ($10^6$) or even Tera Ohms. The design values for a cylindrical heater 14 are from about 1 ohm/square to about 10 ohms/square.

Many different suppliers formulate materials for the first film pad 40 and the second film pad 43. Each combination is optimized for the given application. In addition, different material systems have certain features such as firing profile, power density, noble elements versus non-noble elements, ceramic-based materials, or glass-based materials.

In a preferred embodiment, the at least one first conductive trace 19, the at least one second conductive trace 22 are made from silver and at least one resistive trace 17 is made from a semi-conductive oxide in a matrix of a glass-ceramic compound. The at least one conductive trace 19 could be made from palladium/silver, platinum/silver, palladium/platinum/silver, silver and silver alloys, gold and gold alloys, copper and copper alloys and aluminum and aluminum alloys. Also, a ternary conductor may be added to a paste to get a mixed/bonded conductor paste. This offers improved solder leach resistance and resistance to silver migration, which make this material particularly suitable for harsh environments. The at least one first conductive trace 19 and the at least one second conductive trace 22 exhibit a resistance in the range from about 3 miliohms/square to about 50 miliohms/square.

The at least one resistive trace 17 can be made from, for example, ruthenium-based alloy compound and exhibits a resistance of approximately from about 1 ohm/square to about 100 ohms/square. Other oxides could also be used for a resistive trace, e.g., tin oxide, which can withstand temperatures up to 800 degrees Celsius (1,472 degrees Fahrenheit).

The various resistive traces could be applied to a substrate using a variety of techniques. These techniques include screen printing, pen writing, decal application, chemical vapor deposition, photolithography, sputtering, photoimaging, photoforming, roller printing, and plasma spray.

As mentioned previously, the electrical connector 15 can be placed around the cylindrical heater 14 to protect the contact area where the third electrical conductor 42 and the first film pad 40 as well as the fourth electrical conductor 44 and the second film pad 43 are affixed to the cylindrical heater 14.

Figure 3:
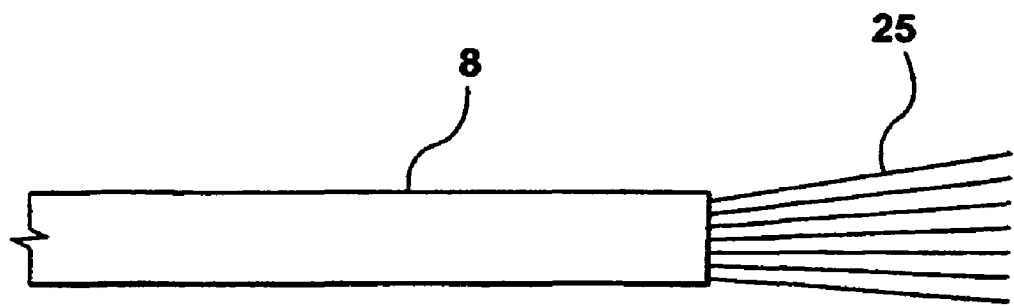
FIG. 3 is an enlarged top view of a conductor wire prior to densification.
Figure 4:
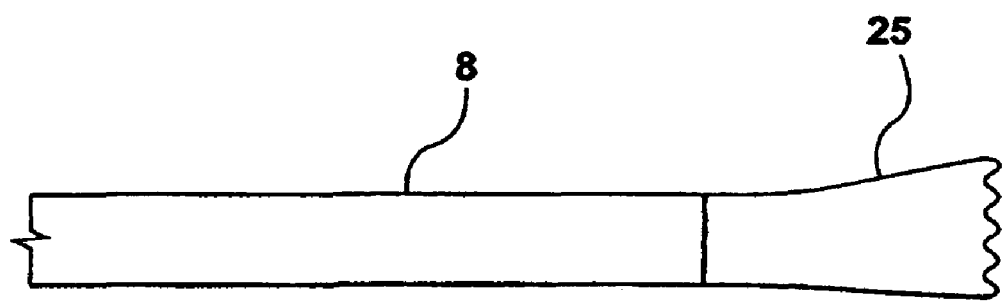
FIG. 4 is an enlarged top view of a conductor wire after densification.
Figure 5:
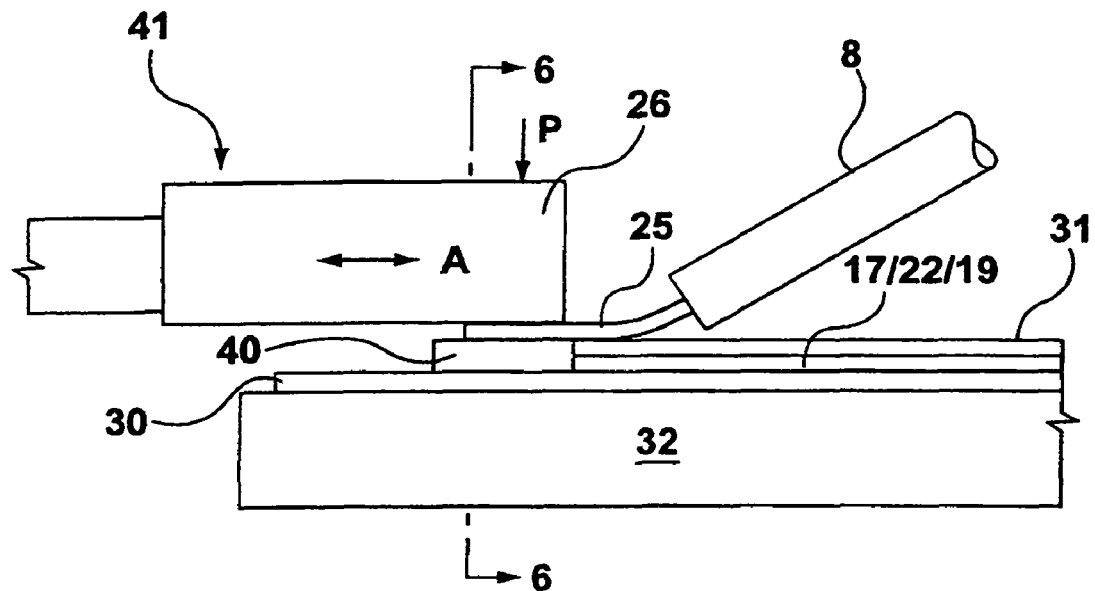
FIG. 5 is a simplified enlarged side view of a thick film device placed in an ultrasonic welding apparatus.

In order to reduce cost and improve reliability of the ultrasonic connection, a densification process is preferably performed on the end of the wire. FIG. 3 illustrates the first electrical conductor 8 and a termination 25 for the first electrical conductor 8. FIG. 4 illustrates the first electrical conductor 8 and the termination for the first electrical conductor 8 after the termination 25 has been subjected to a densification process. During the densification process, the wire strands of termination 25 are placed, for example, in an ultrasonic welding machine, where the individual strands are subjected to ultrasonic, vibrational energy that bonds the individual strands into a single unitary piece. An ultrasonic welding gun 41, as shown in FIG. 5, was found to work well for this process. An illustrative, but nonlimiting example, of an ultrasonic welding gun 41 can be obtained from AmTech®. AmTech® is a federally registered trademark of Branson Ultrasonics Corporation, having a place of business at 41 Eagle Road, Commerce Park, Danbury, Conn. 06813-1961.

This process eliminates the need for the attachment of a separate terminal lug. The termination 25 can now be ultrasonically welded to a film pad directly, e.g., the first film pad 40. It is also contemplated that the densification process be performed using a high temperature solder or brazing material that is introduced into the termination 25. For example, a high temperature silver brazing material could be used to bind the individual strands of the termination 25 together, thereby allowing the termination 25 to be ultrasonically welded to the first film pad 40. In a preferred embodiment, it is desirable to add a protective coating over the area where the termination 25 is connected to the first film pad 40 to reduce oxidation at the joint. For example, a thin sheet of silver or gold foil may be ultrasonically welded to this area. In the preferred embodiment, a silver paste applied over this area, where the termination 25 is connected to the first film pad 40, was found to be the means that was the quickest and most cost-effective. This is also replicated for the second electrical conductor 9 and the second film pad 43.

Figure 6:
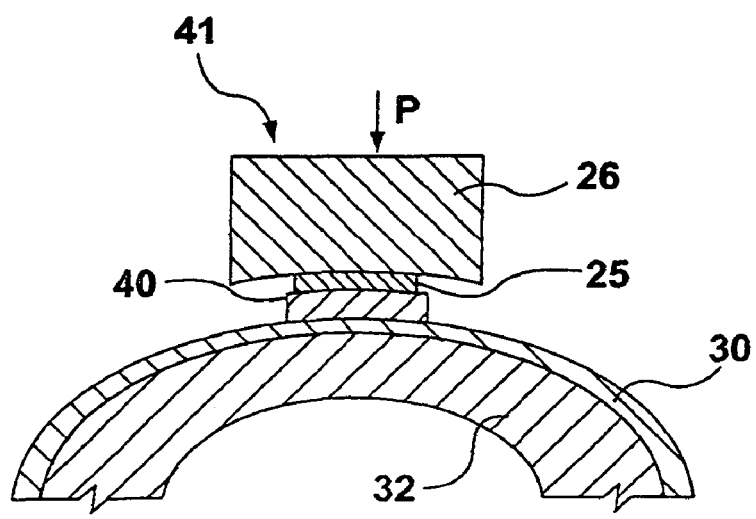
FIG. 6 is a cross-sectional view taken along Line 6-6 in FIG. 5, of an ultrasonic welding apparatus in communication with a thick film device.

Referring now to FIGS. 5 and 6, which illustrate a simplified schematic view of the first electrical conductor 8 being attached to the first film pad 40 by the ultrasonic welding gun 41. The ultrasonic welding gun 41 includes an ultrasonic welding head 26 in accordance with one embodiment of the present invention. In these figures, a substrate 32 is disclosed. This substrate 32 can be any arcuate surface and is preferably the surface of the cylindrical heater 14. The substrate 32 comprises a first insulative layer 30 disposed directly on a surface of the substrate 32. This layer 30 is only needed when the substrate 32 is made from an electrically conductive material, e.g., steel. If the substrate 32 was made from an electrically insulative material like a ceramic or glass based alloy, then layer 30 may not be needed. Disposed on top of layer 30 are at least one first conductive trace 19, at least one second conductive trace 22, and at least one resistive trace 17. It should be noted that both the at least one first conductive trace 19, the at least one second conductive trace 22 and the at least one resistive trace 17 are preferably on the same level and form the active part of the cylindrical heater 14. This layer is the active layer that makes up the cylindrical heater 14 and generates heat. The first film pad 40 and the second film pad 43 (not shown) are also on this layer and is preferably in electrical communication with the at least one first conductive trace 19, the at least one second conductive trace 22 and/or the at least one resistive trace 17. An optional second insulative layer 31 can also be applied on top of the at least one resistive trace 17 and the at least one conductive trace 19. This second insulative layer 31 is not applied over a film pad, e.g., the first film pad 40, so that the termination 25 may directly contact the first film pad 40.

The wire termination 25 is placed between the first film pad 40 and the ultrasonic head 26 of the ultrasonic welding gun 41. A predetermined force denoted by arrow P is applied to ultrasonic head 26 to maintain intimate contact between the termination 25 and the first film pad 40. The ultrasonic head 26 is vibrated in the direction denoted by arrow A at ultrasonic frequencies between 20-50 kHz for a predetermined time to create a bond between the termination 25 and the first film pad 40. Testing revealed that a frequency of about 40 kHz worked best. Although not shown in the figures, the attachment of wire termination 25 to the first film pad 40 could also be accomplished by a high pressure rolling device. The rolling device would apply a pressure between the termination 25 and the first film pad 40 while an anvil is rolled over the connection area to generate friction between the two and form a metallurgical bond therebetween. The anvil would be designed to follow the arcuate curvature of the substrate.

In a preferred embodiment it was determined that a force in a range from about one (1) pound (0.45 kilograms) to about 300 pounds (136.1 kilograms) normal to the ultrasonic bond was required to produce an acceptable bond. A force of around 150 pounds (68.04 kilograms) was determined to provide the most reliable results.

As shown in FIG. 6, when attaching the first electrical conductor 8 to a non-flat substrate 32, it may be preferable to use an ultrasonic welding head 26 that has a mating curved surface to ensure good contact with the termination 25 while applying the ultrasonic energy. As previously stated, this is also replicated for the second electrical conductor 9 and the second film pad 43.

Figure 7:
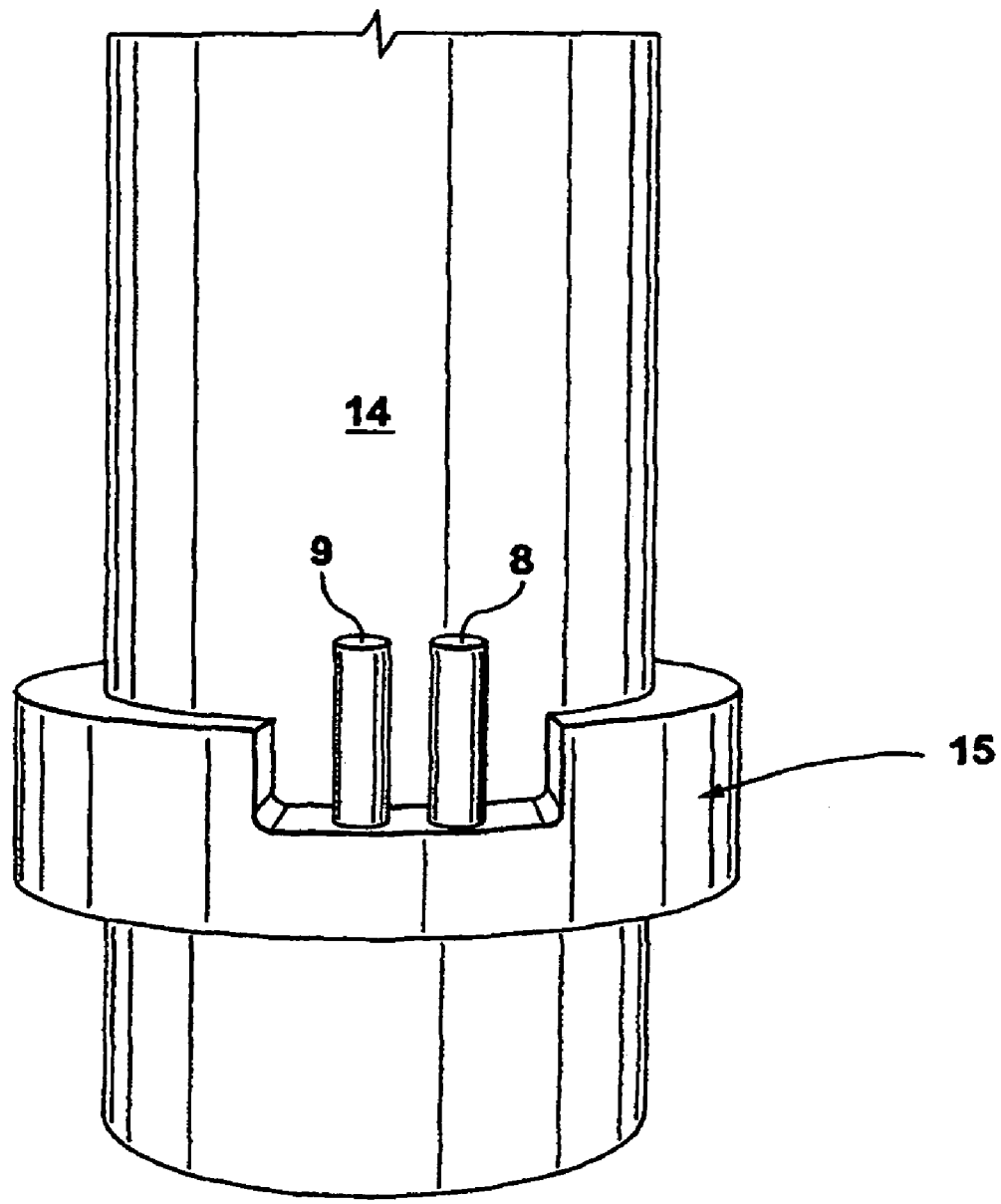
FIG. 7 is a perspective view of the first embodiment of an electrical conductor assembly and cylindrical heater for an injection molding machine.

Referring now to FIG. 7, a first illustrative embodiment of the previously described electrical connector 15 is shown. This is where the first electrical conductor 8 is connected to a first film pad 40 and the second electrical conductor 9 is connected to a second film pad 43, as previously shown in FIG. 2. The purpose of the electrical connector 15 housing is to electrically insulate and protect the connection between the electrical conductors 8 and 9 and the film pads 40 and 43. A wide variety of materials can suffice such as ceramic, glass and polymer based materials. An illustrative, but nonlimiting, example of high temperature polymer based materials includes S-2000™ manufactured by Cuyahoga Plastics, having a place of business at 1265 Babbitt Road, Cleveland, Ohio 44132. S-2000™ is a glass and mineral-filled silicone thermoset molding material designed for components requiring extreme high temperature performance. S-2000™ can be supplied in granular form or preforms. Optionally, the electrical connector 15 can be secured to the cylindrical heater 14 with a high temperature adhesive. An illustrative, but nonlimiting, example includes CERMABOND™, which is available from Aremco Products, Inc., having a place of business at Post Office Box 517, 707-B Executive Blvd., Valley Cottage, N.Y. 10989.

Figure 8:
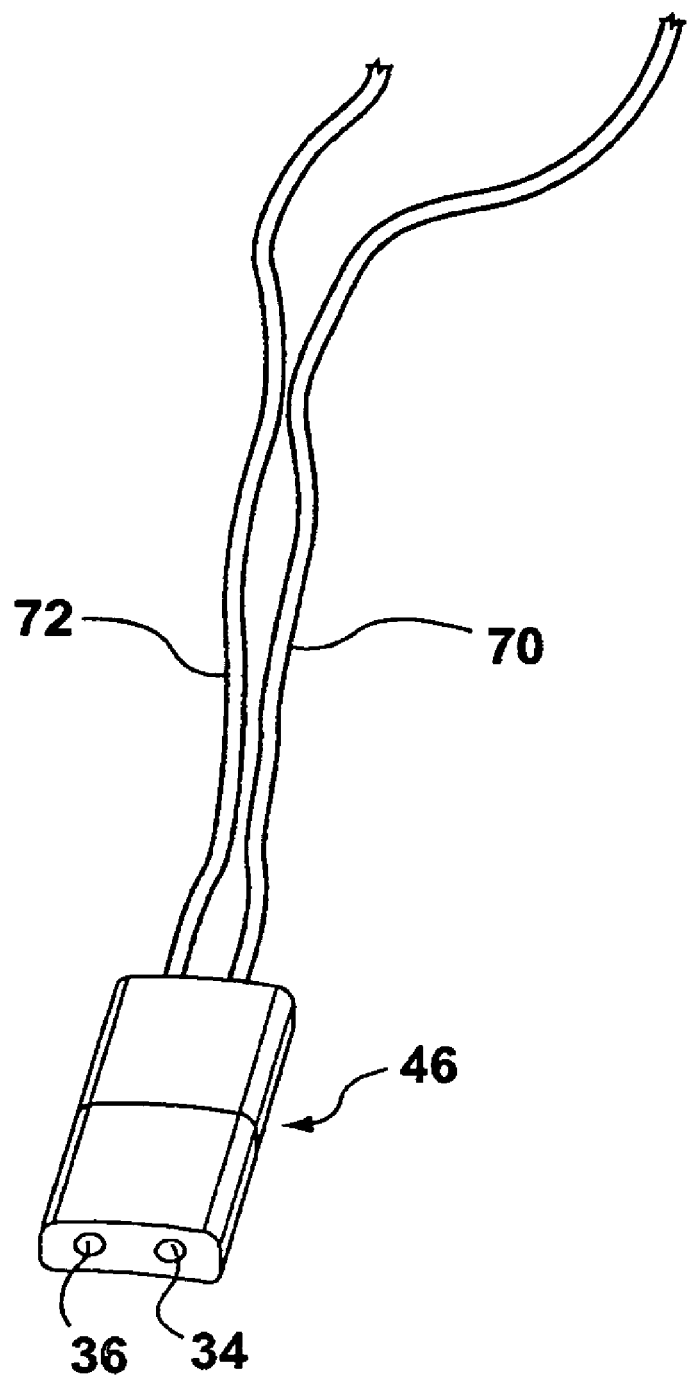
FIG. 8 is a perspective view of a female connector utilized in conjunction with the electrical conductor assembly shown in FIG. 7.

Referring now to FIG. 8, there is a female connector that is generally indicated by numeral 46. An illustrative, but nonlimiting, example of a female connector 46 is a receptacle. There is a first female inlet opening 34, having a u-shaped conductive member, and a second inlet female opening 36, having a u-shaped conductive member, for receiving in electrical connection the first electrical conductor 8 and the second electrical conductor 9, respectively. The first female inlet opening 34 is electrically connected to a third electrical conductor 70, e.g., wire, and the second inlet female opening 36 is electrically connected to a fourth electrical conductor 72, e.g., wire.

Figure 9:
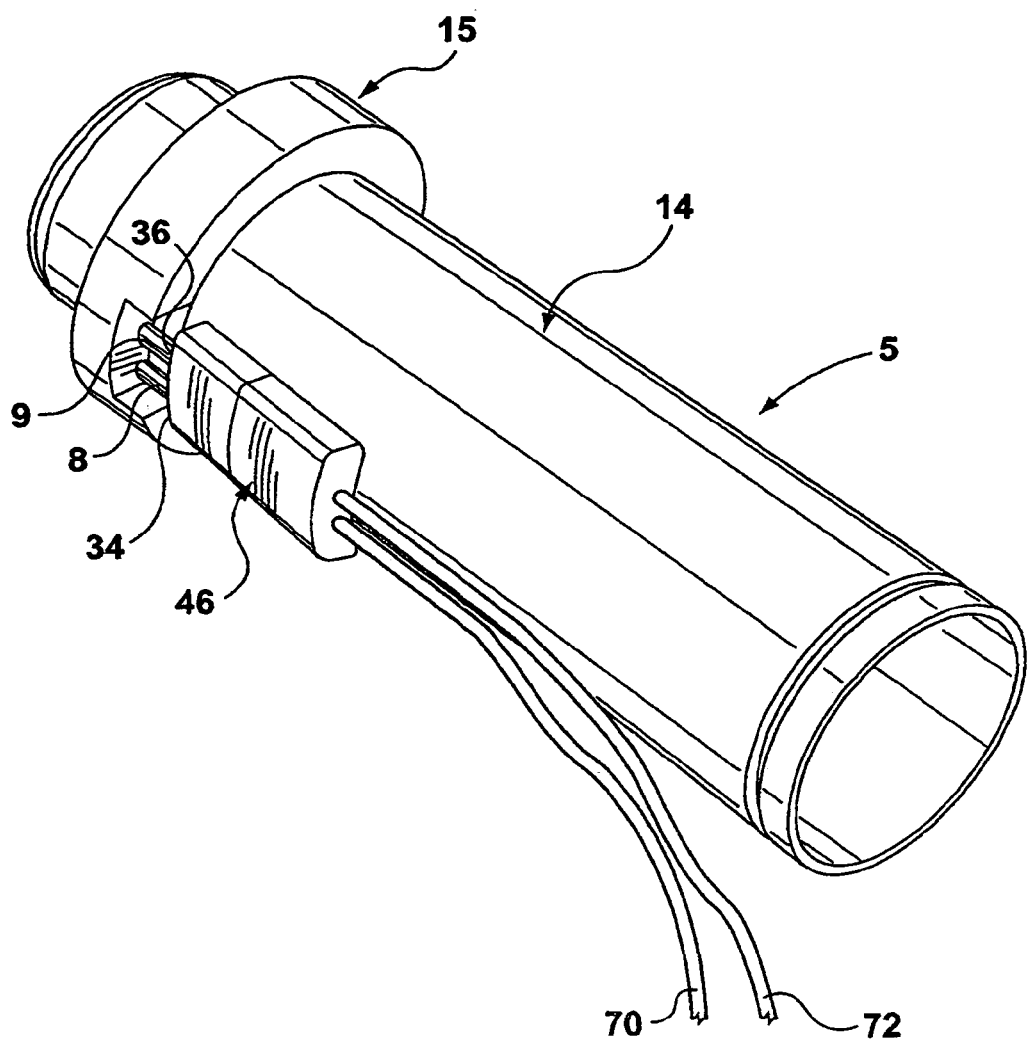
FIG. 9 is a perspective view of the female connector of FIG. 8 engaged with the electrical conductor assembly shown in FIG. 7.

The first female inlet opening 34, having a u-shaped conductive member, and a second inlet female opening 36, having a u-shaped conductive member, are for engaging and securing the first electrical conductor 8 and the second electrical conductor 9, respectively, to provide a disconnectable electrical connection, which is shown in FIG. 9 and this combination is the electrical conductor assembly generally indicated by numeral 5. An illustrative, but nonlimiting, example of the combination of the first electrical conductor 8 and the second electrical conductor 9 includes a male-type plug.

Power can be applied to the heater 14 through the third electrical conductor, e.g., wire, 70 and the fourth electrical conductor, e.g., wire, 72 through the first female inlet opening 34 and the second inlet female opening 36 and then through the first electrical conductor 8 and the second electrical conductor 9 and then onto the first film pad 40 and the second film pad 43, respectively, when the female connector 46 is engaged to generate heat energy for the cylindrical heater 14 as previously described above. This female connector 46 operates as a disconnect mechanism. Although in this illustrative embodiment the connector 46 is female, virtually any type of electrical connector that can be disconnected and withstand high temperatures will suffice. In an illustrative, but nonlimiting, example, the female connector 46 can be a male-type connector with the first electrical conductor 8 and the second electrical connector 9 forming or electrically attached to a female-type jack (not shown).

Figure 10:
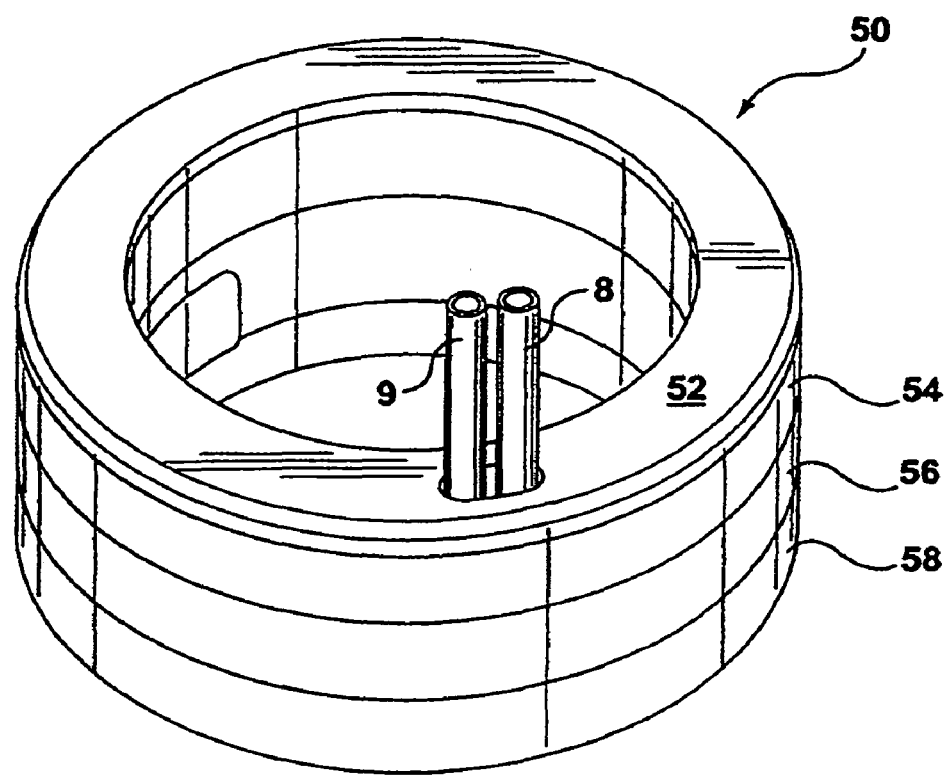
FIG. 10 is a perspective view of a second embodiment of an electrical connector for a cylindrical heater for an injection molding machine.
Figure 11:
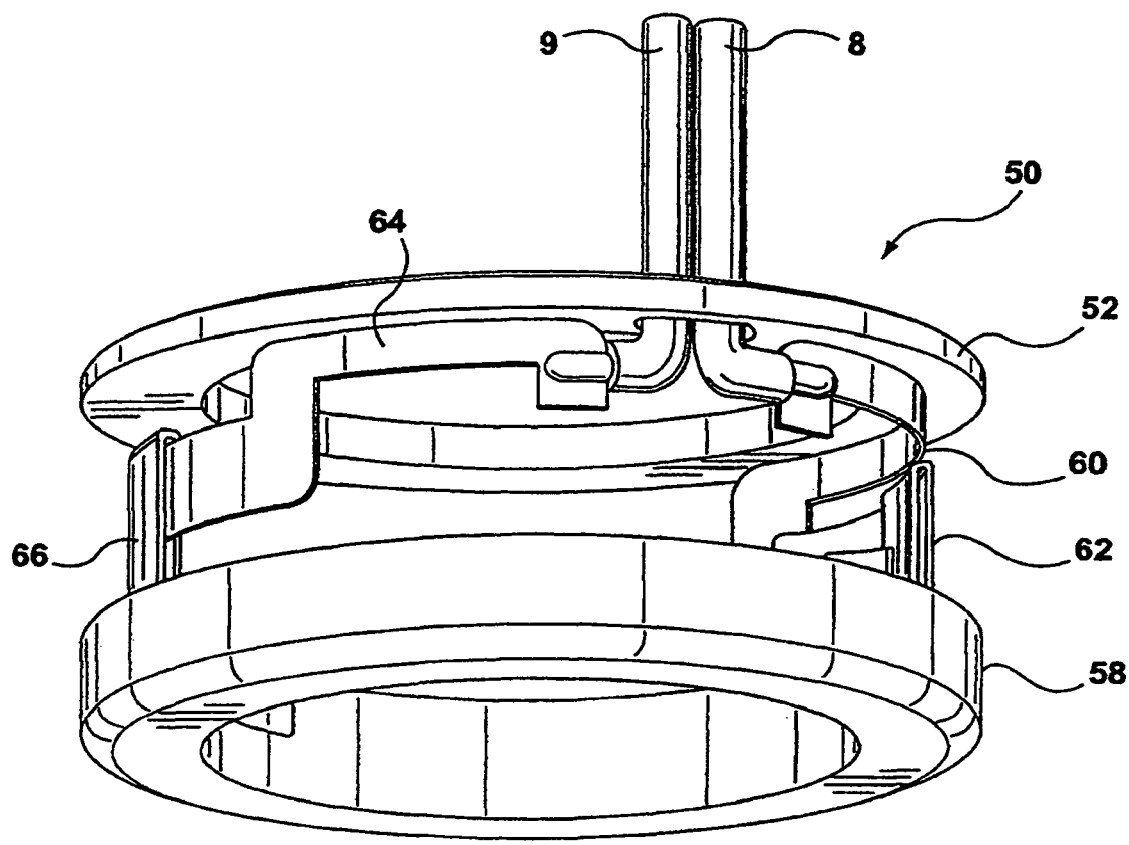
FIG. 11 is a perspective view of the second embodiment of an electrical connector for a cylindrical heater for an injection molding machine, shown in FIG. 10, without an upper ring and a middle ring.

A second embodiment is shown in FIGS. 10 and 11, which illustrate an electrical connector that is generally indicated by numeral 50. A wide variety of interconnecting high temperature components can be utilized, which include a myriad of geometric structures or even a unitary structure can be utilized to form a housing. However, in this illustrative but nonlimiting example, there is an upper ring 54 positioned over a middle ring 56. The middle ring 56 is positioned over a lower ring 58. Positioned over the upper ring 54 is a ring top 52.

Referring now to FIG. 11, the electrical connector 50 is shown with the upper ring 54 and the middle ring 56 removed for clarity. The first electrical conductor 8 is electrically connected to a first contact assembly 60 that is attached to a first contact blade 62. The second electrical conductor 9 is electrically connected to a second contact assembly 64 that is attached to a second contact blade 66. This connection can be through spot welding, brazing, ultrasonically welding, as well as numerous other known methods of electrical attachment.

The rotation of an arcuate surface, e.g., similar to the cylindrical heater 14 previously shown in FIG. 2 with the first film pad 40 and the second film pad 43 spaced one hundred and eighty degrees (180°) apart on the cylindrical heater 14, will engage the first contact assembly 60 and in particular, the first contact blade 62 with the first film pad 40. In the same manner, the rotation of an arcuate surface, e.g., cylindrical heater 14, will engage the second contact assembly 64 and in particular, the second contact blade 66 with the second film pad 43. Therefore, through rotation in a limited angle to engage the first contact blade 62 and the second contact blade 66, will create an electrical path to an electricity supply. Preferably, but not necessarily, once these first and second contact blades 62 and 66 contact and preferably mate, axial movement is prevented and the arcuate surface, e.g., cylindrical heater 14, and the electrical connector 50 are held together in an electrical connection.

The first contact blade 62 and the second contact blade 66 are preferably, but not necessarily, profiled and stamped from suitable alloy and are formed into a suitable shape, e.g., rectangular shape, to effectively contact the first film pad 40 and the second film pad 43, respectively. Preferably, there is an application of a resilient, spring-type force to secure the first contact blade 62 and the second contact blade 66 against the first film pad 40 and the second film pad 43, respectively.

Figure 12:
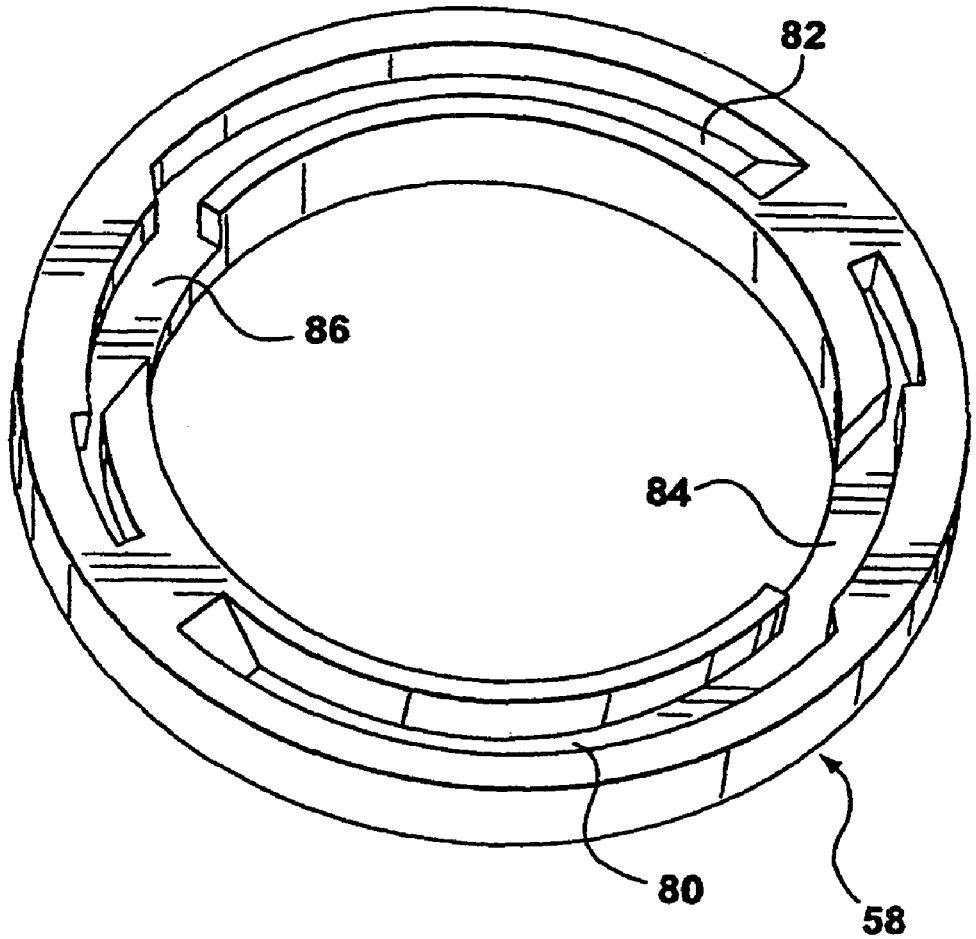
FIG. 12 is a perspective view of a lower ring for the electrical connector for a cylindrical heater for an injection molding machine shown in FIG. 10.

Referring now to FIG. 12, an isolated view of the lower ring 58 is illustrated with a first indentation 80 for receiving the first contact blade 62 with a first opening 84 that provides contact between the first contact blade 62 and the first film pad 40. There is a second indentation 82 for receiving the second contact blade 66 and a second opening 86 that provides contact between the second contact blade 66 and the second film pad 43.

Figure 13:
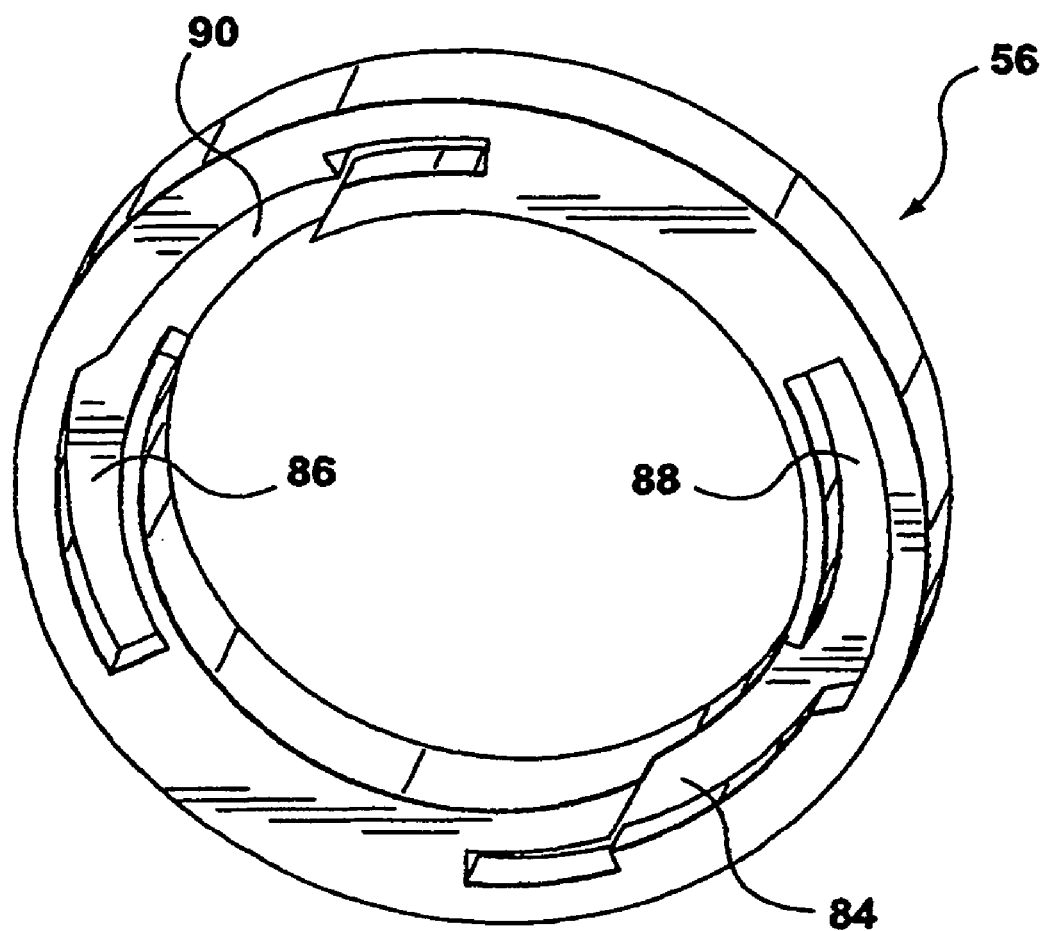
FIG. 13 is a perspective view of a middle ring for the electrical connector for a cylindrical heater for an injection molding machine shown in FIG. 10.

Referring now to FIG. 13, an isolated view of the middle ring 56 is illustrated with a third indentation 88 for receiving the first contact blade 62 and the first opening 84 that provides contact between the first contact blade 62 with the first film pad 40. There is a fourth indentation 90 for receiving the second contact blade 66 and the second opening 86 that provides contact between the second contact blade 66 with the second film pad 43.

Figure 14:
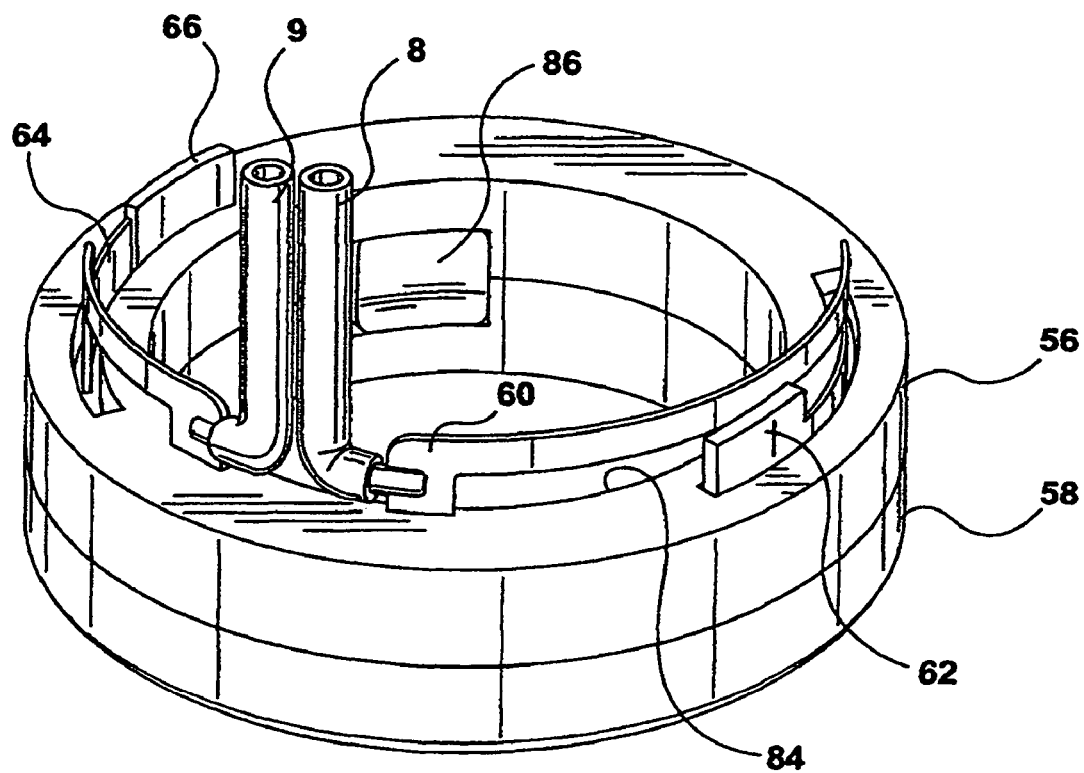
FIG. 14 is a perspective view of a second embodiment of an electrical connector for a cylindrical heater for an injection molding machine, shown in FIG. 10, without an upper ring and a ring top.

Referring now to FIG. 14, an isolated view of a combination of the lower ring 58 and the middle ring 56 is illustrated with the middle ring 56 positioned on top of the lower ring 58. The first electrical conductor 8 is electrically connected to a first contact assembly 60 which is then attached to a first contact blade 62 and in electrical connection therewith. The second electrical conductor 9 is electrically connected to a second contact assembly 64 which is then attached to a second contact blade 66 in electrical connection therewith. The first contact blade 62 is exposed through the first opening 84 to engage the first film pad 40. In the same manner, the second contact blade 66 is exposed through the second opening 86 to engage the second film pad 43.

As previously explained with regard to the first embodiment, virtually any type of high temperature, electrical connector can supply electrical power to the first electrical conductor 8 and second electrical conductor 9 and be disconnected from the electrical power can operate as a disconnect mechanism to form an electrical conductor assembly.

Figure 15:
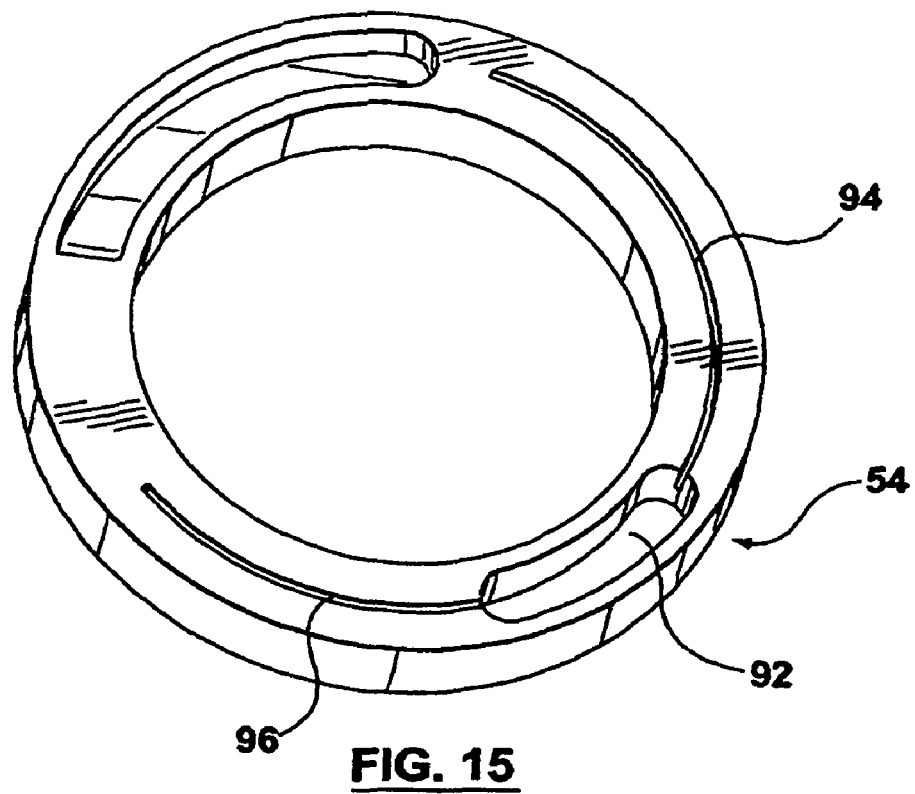
FIG. 15 is a perspective view of an upper ring for the electrical connector for a cylindrical heater for an injection molding machine shown in FIG. 10.

Referring now to FIG. 15, an isolated view of the upper ring 54 is illustrated with a fifth indentation 94 for receiving the first contact assembly 60. There is a sixth indentation 96 for receiving the second contact assembly 64. There is an opening 92 for allowing passage of the first electrical conductor 8 and the second electrical conductor 9.

Figure 16:
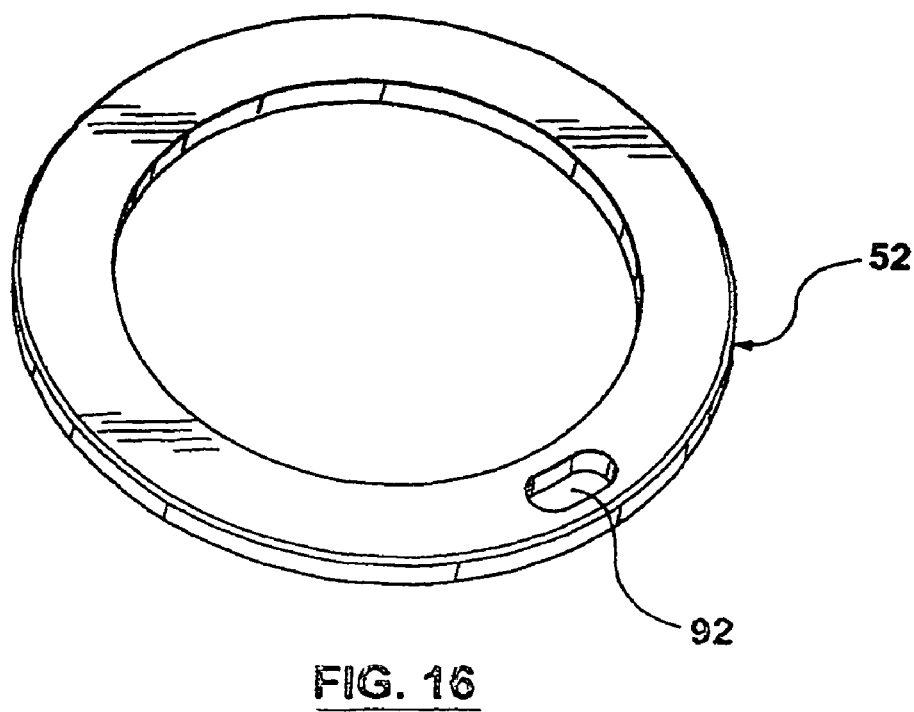
FIG. 16 is a perspective view of a ring top for the electrical connector for a cylindrical heater for an injection molding machine shown in FIG. 10.

Referring now to FIG. 16, an isolated view of the ring top 52 is illustrated with the opening 92 for allowing passage of the first electrical conductor 8 and the second electrical conductor 9.

Figure 17:
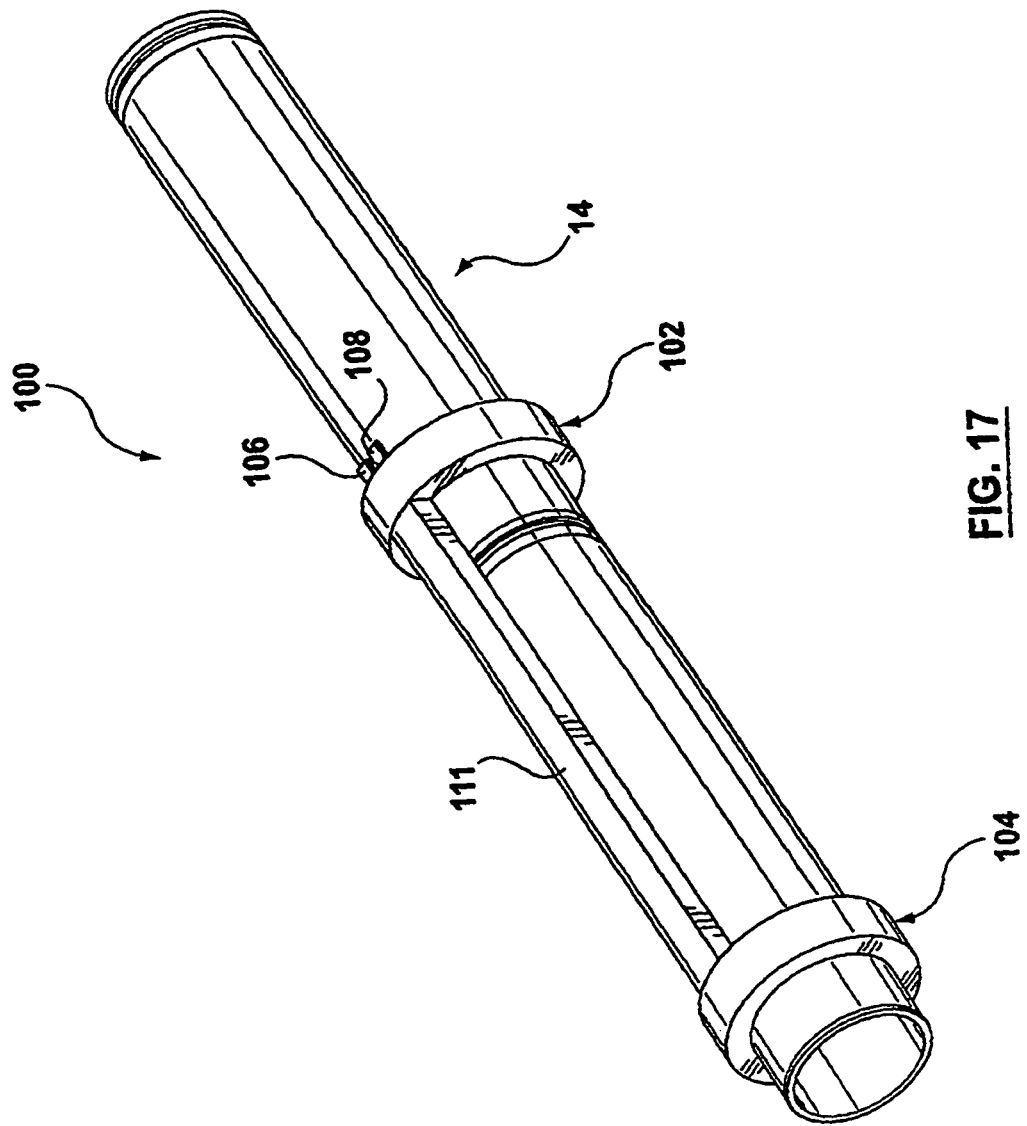
FIG. 17 is a perspective view of a third embodiment of an electrical connector for a cylindrical heater for an injection molding machine having a plurality of electrical conductor assemblies.

Referring now to FIG. 17, a third embodiment is generally indicated by numeral 100. An arcuate surface such as that provided by a cylindrical heater, as previously described, is indicated by numeral 14. There is a first electrical connector indicated by numeral 102 and a second electrical connector that is indicated by numeral 104. The cylindrical heater 14 can be a single heater, a heater with elongate nozzle housing and/or multiple two heaters joined together or linked in series. There is a first electrical power conductor 106 and a second electrical power conductor 108 that provide electrical power to the first electrical connector 102. There is an electrical jumper assembly 111 that provides electrical power to the second electrical connector 104 from the first electrical power conductor 106 and a second electrical power conductor 108.

Figure 18:
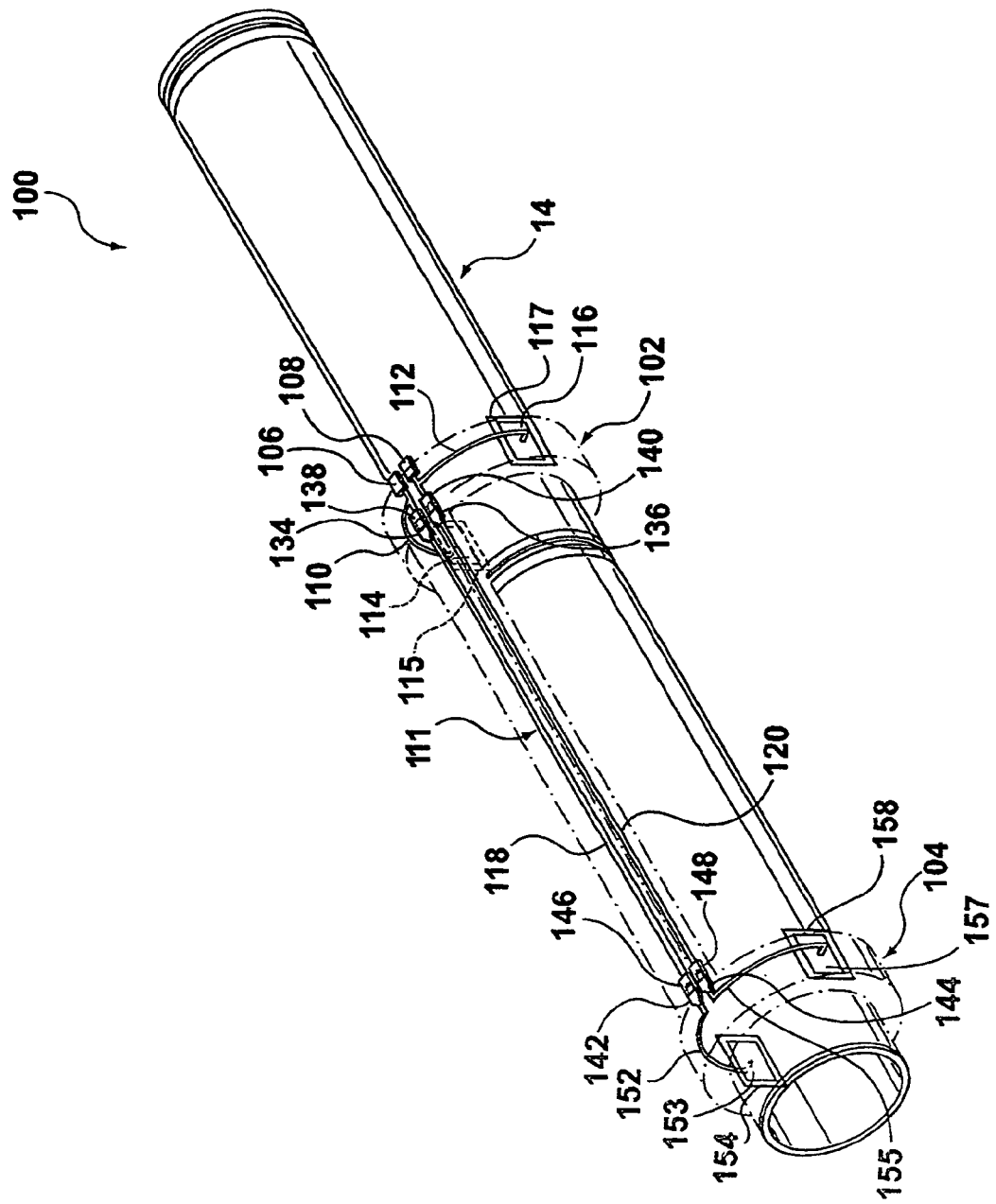
FIG. 18 is the perspective and internal view for the third embodiment of an electrical connector for a cylindrical heater for an injection molding machine having a plurality of electrical conductor assemblies, as shown in FIG. 17, illustrating the enclosed electrical interconnections.

Referring now to FIG. 18, the first electrical power conductor 106 is electrically connected to a first electrical conductor 110 that is electrically connected to a first contact blade 114, and the second electrical power conductor 108 is electrically connected to a second electrical conductor 112 that is electrically connected to a second contact blade 116. The first contact blade 114 can electrically connect with a first conductive portion 115, e.g., film pad, on an arcuate portion of the cylindrical heater 14 and the second contact blade 116 can electrically connect with a second conductive portion 117, e.g., film pad, on an arcuate portion of the cylindrical heater 14.

Figure 19:
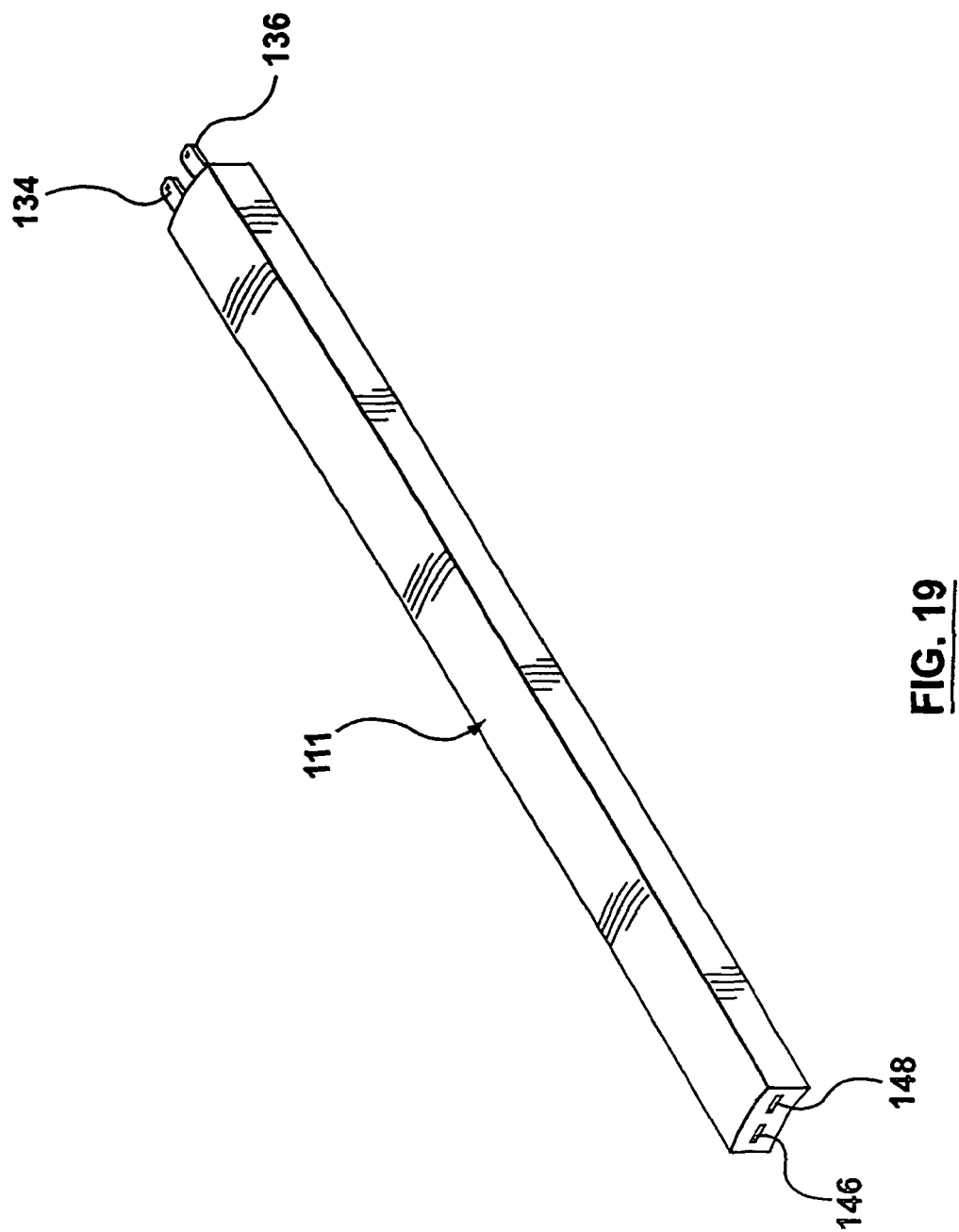
FIG. 19 is the perspective view of the electrical jumper assembly for the third embodiment of an electrical connector for a cylindrical heater for an injection molding machine having a plurality of electrical conductor assemblies as shown in FIG. 17.
Figure 20:
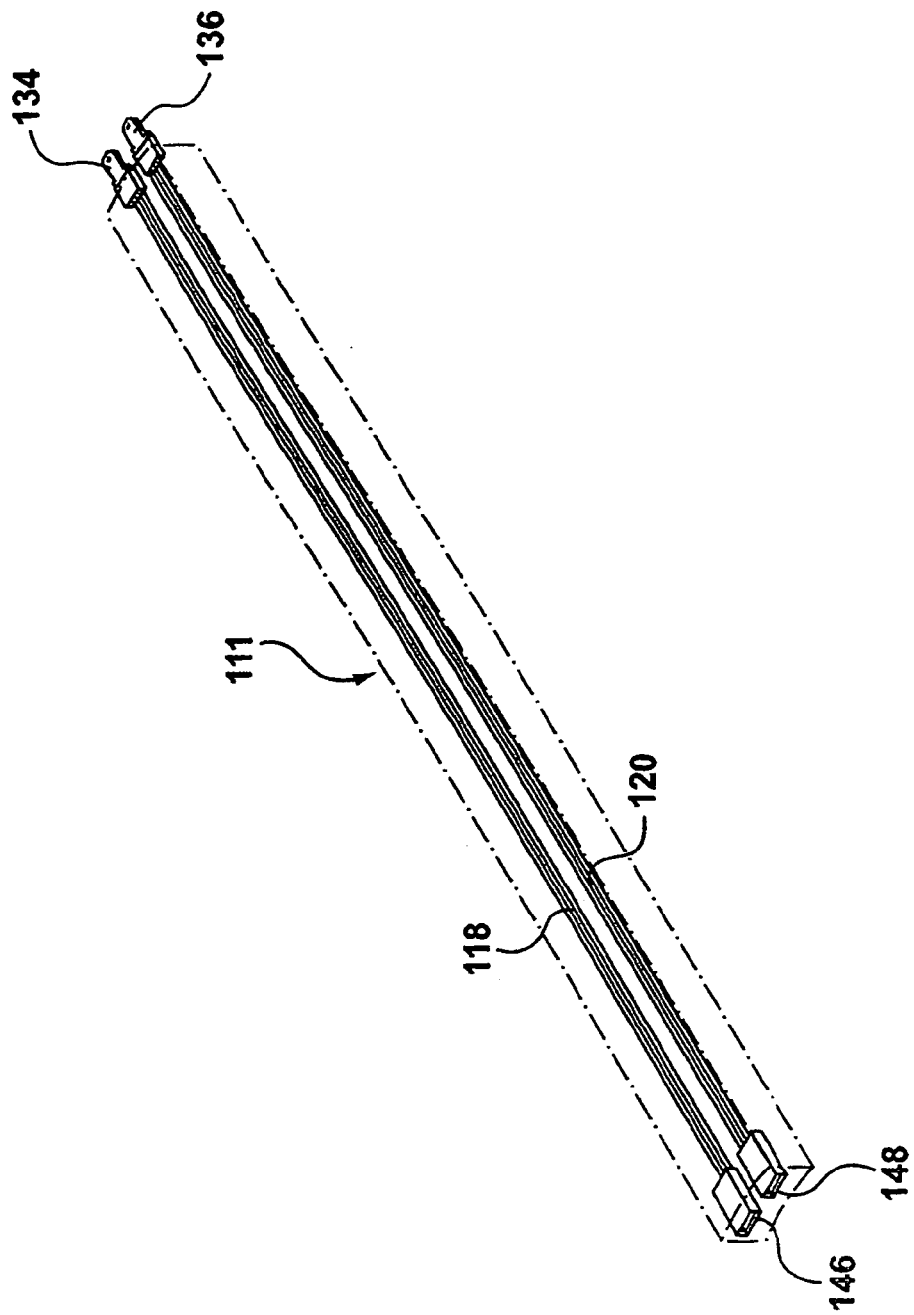
FIG. 20 is the perspective view of the electrical jumper assembly for the third embodiment of an electrical connector for a cylindrical heater for an injection molding machine having a plurality of electrical conductor assemblies, as shown in FIG. 19, illustrating the internally enclosed electrical interconnections.

Referring now to FIGS. 18, 19 and 20, there is a third electrical conductor 118 that is electrically connected to the first electrical power inlet 106 and the first electrical conductor 110, and a fourth electrical conductor 120 that is electrically connected to the second electrical power inlet 108 and the second electrical conductor 112. The third electrical conductor 118 and the fourth electrical conductor 120 are secured within an electrical jumper assembly 111. Optionally, the electrical jumper assembly 111 can be made from a wide variety of materials including, but not limited to, high temperature, silicon-based, thermoset insulation material.

In a similar manner, a wide variety of interconnects with the electrical jumper assembly 111 can be utilized so to electrically connect the second electrical connector 104 to the third electrical conductor 118 and the fourth electrical conductor 120. As shown in FIGS. 18, 19 and 20, an illustrative, but nonlimiting, example includes a first male connector 134 and a second male connector 136 that interconnect into a first female receptor 138 and a second female receptor 140 that are located within the first electrical connector 102, as shown in FIG. 18. Also, as shown in FIGS. 18, 19 and 20, an illustrative, but nonlimiting, example includes a third female receptacle 146 and a fourth female receptacle 148 that interconnect into a third male connector 142 and a fourth male connector 144 that are located within the second electrical connector 104, as shown in FIG. 18. However, the nature and type of electrical interconnection can vary greatly and is not necessarily limited to male and female interconnections as well as the sequence of electrical interconnection between male-type and female-type interconnections.

The third male connector 142 is electrically connected to a fifth electrical conductor 152, which is electrically connected to a third contact blade 153. The fourth male connector 144 is electrically connected to a sixth electrical conductor 155, which is electrically connected to a fourth contact blade 157. The third contact blade 153 can electrically connect with a third conductive portion 154, e.g., film pad, on an arcuate portion of the cylindrical heater 14 and the fourth contact blade 157 can electrically connect with a fourth conductive portion 158, e.g., film pad, on an arcuate portion of the cylindrical heater 14.

As previously explained with regard to the first, second and third embodiments, virtually any type of high temperature, electrical connector can supply electrical power to the first electrical conductor and second electrical conductor and be disconnected from the electrical power can operate as a disconnect mechanism to form a electrical connector assembly.

Figure 21:
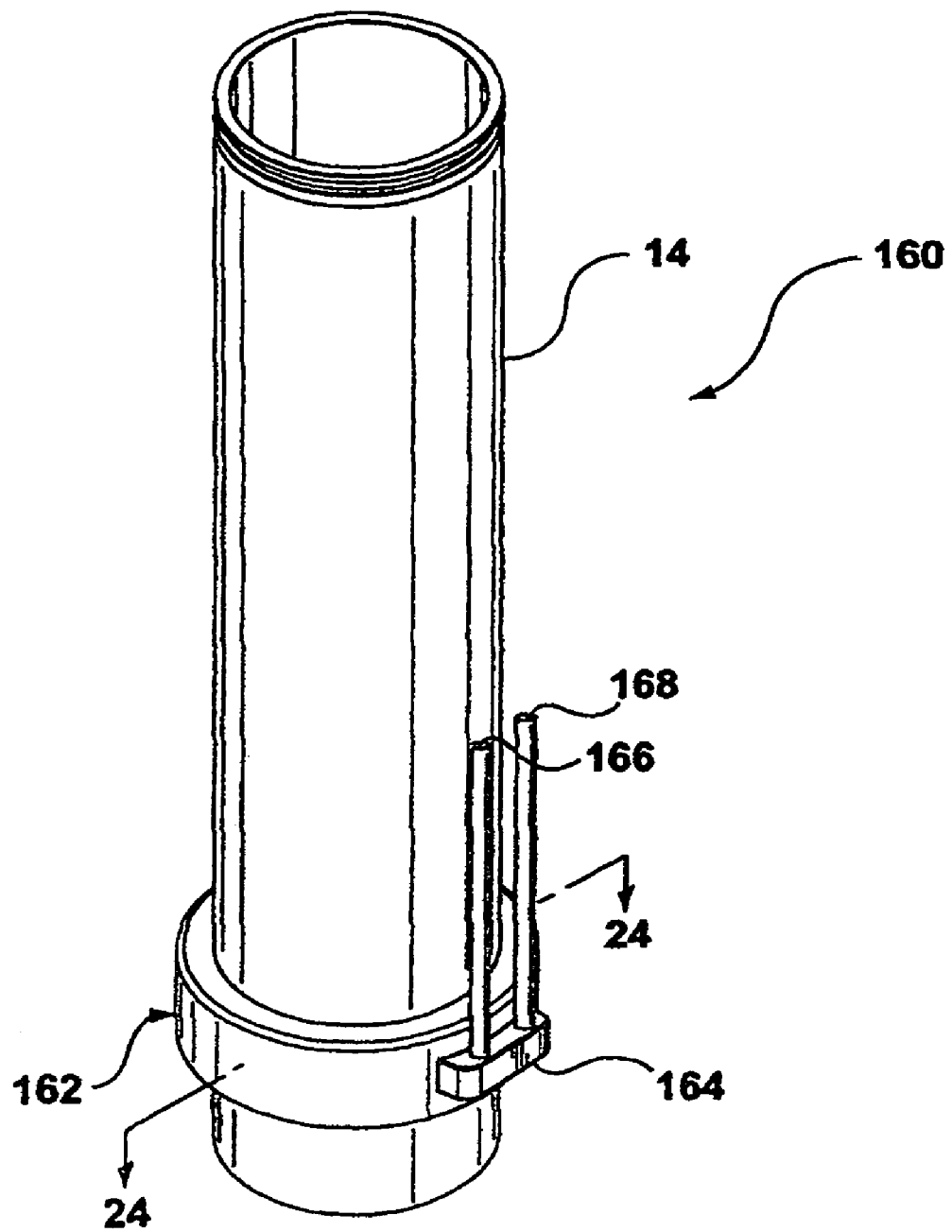
FIG. 21 is the perspective view for a fourth embodiment of an electrical connector assembly for a cylindrical heater for an injection molding machine, which is a removable engagement connector attached to the connector assembly.
Figure 22:
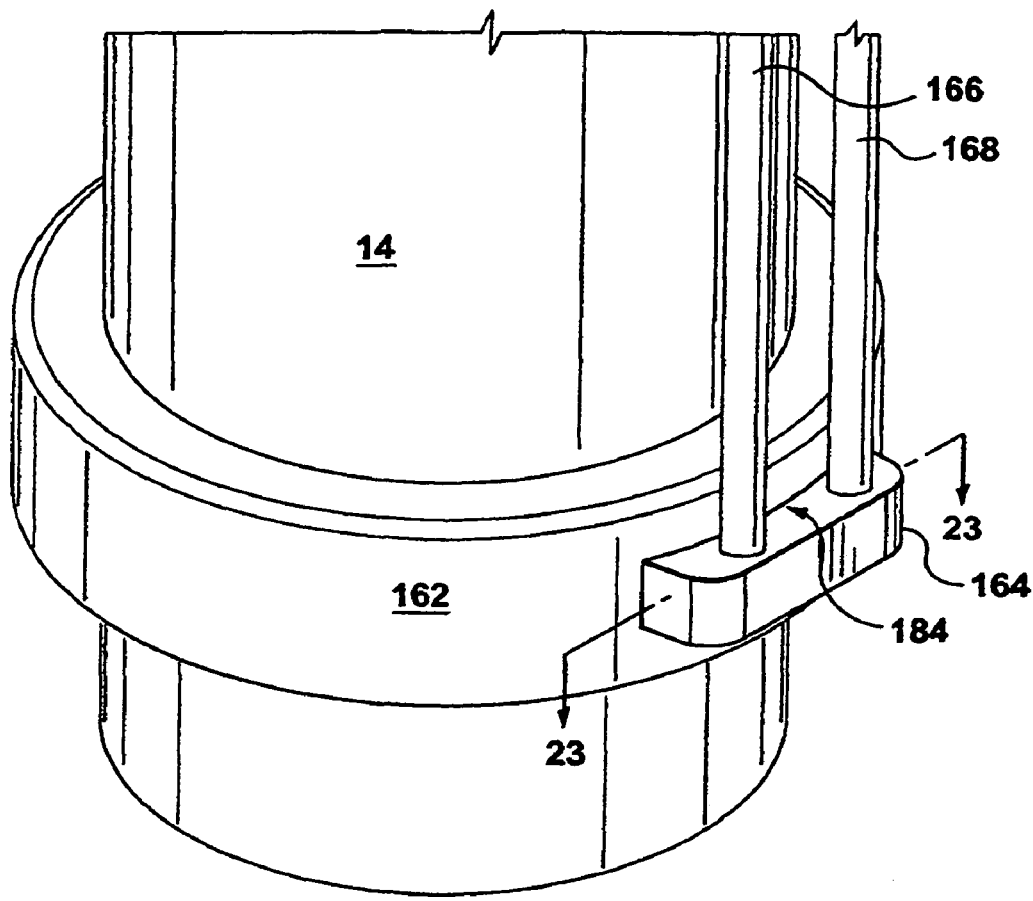
FIG. 22 is the perspective view for the fourth embodiment of an electrical connector assembly for a cylindrical heater for an injection molding machine, as shown in FIG. 21, which is a removable engagement connector attached to the connector assembly.

Referring now to FIG. 21, a fourth embodiment is generally indicated by numeral 160. This includes a connector assembly that is generally indicated by numeral 162. An arcuate surface such as that provided by a cylindrical heater, as previously described, is indicated by numeral 14. There is a first electrical conductor 166 and a second electrical conductor 168 to provide power to a removable engagement connector 164. Preferably, but not necessarily, engagement occurs when the removable engagement connector 164 is pressed into engagement with the conductor assembly 162 with an audible indication, e.g., "snap." As shown in FIG. 22, the preferred embodiment of the removable engagement connector 164 includes a removal feature 184 (slot) for disconnecting the removable engagement connector 164 from the connector assembly 162 to form a disconnect mechanism. This is a position to apply pressure that will readily disengage the engagement connector 164.

Figure 23:
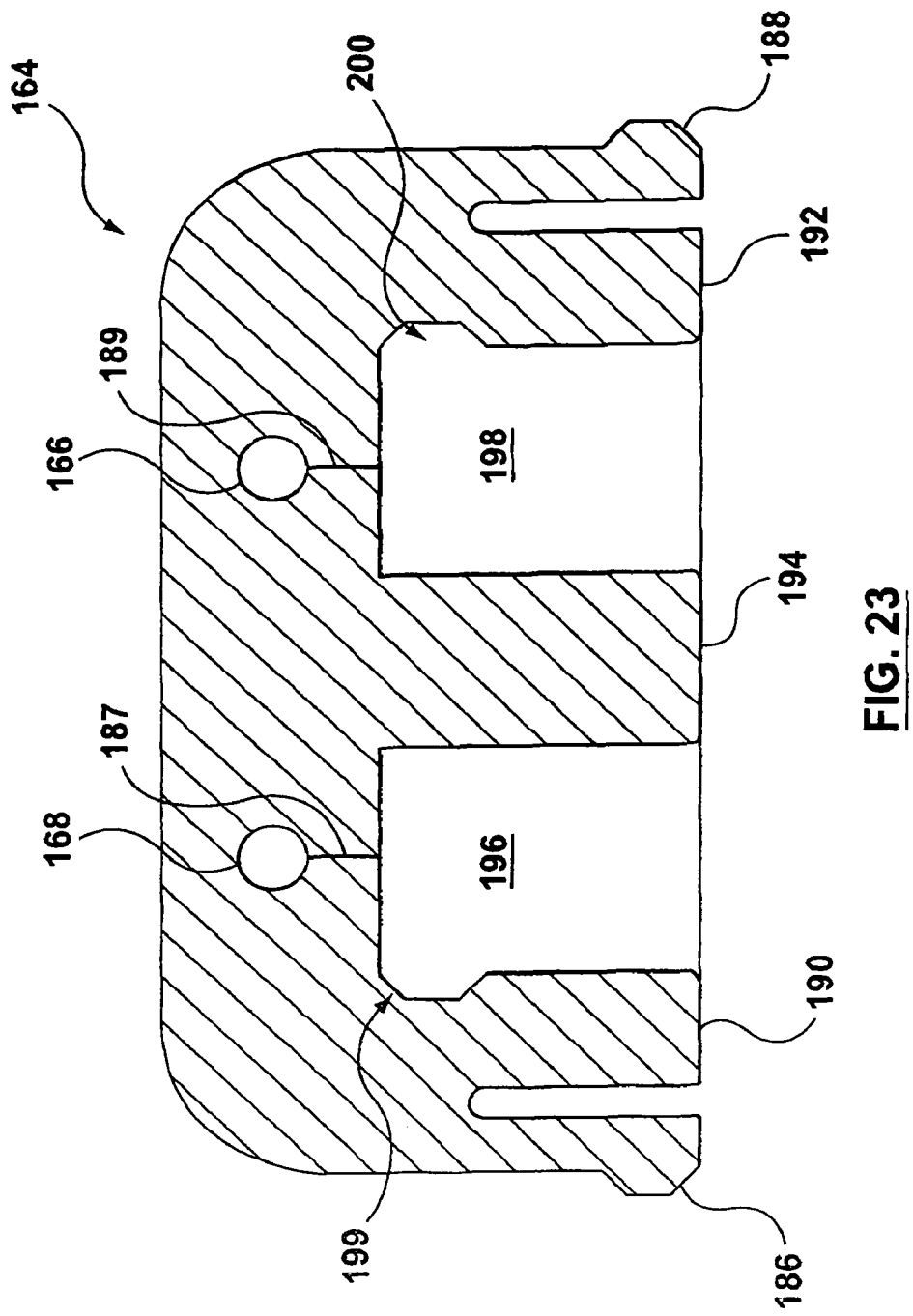
FIG. 23 is a cross-sectional view taken along Line 23-23 in FIG. 22 of the removable engagement connector.

Referring now to FIG. 23, the removable engagement connector 164 includes a first outer arm 186, a second outer arm 188, a first inner arm 190, a second inner arm 192, and a middle arm 194. There is a first electrically conductive cavity 196 that is electrically connected to the second electrical conductor 168 via a third electrical conductor 187 and a second electrically conductive cavity 198 that is electrically connected to the first electrical conductor 166 via a fourth electrical conductor 189. The first conductive cavity 196 of the removable engagement connector 164 may optionally include a recessed indentation 199 and the second conductive cavity 198 of the removable engagement connector 164 may optionally include a recessed indentation 200.

Figure 24:
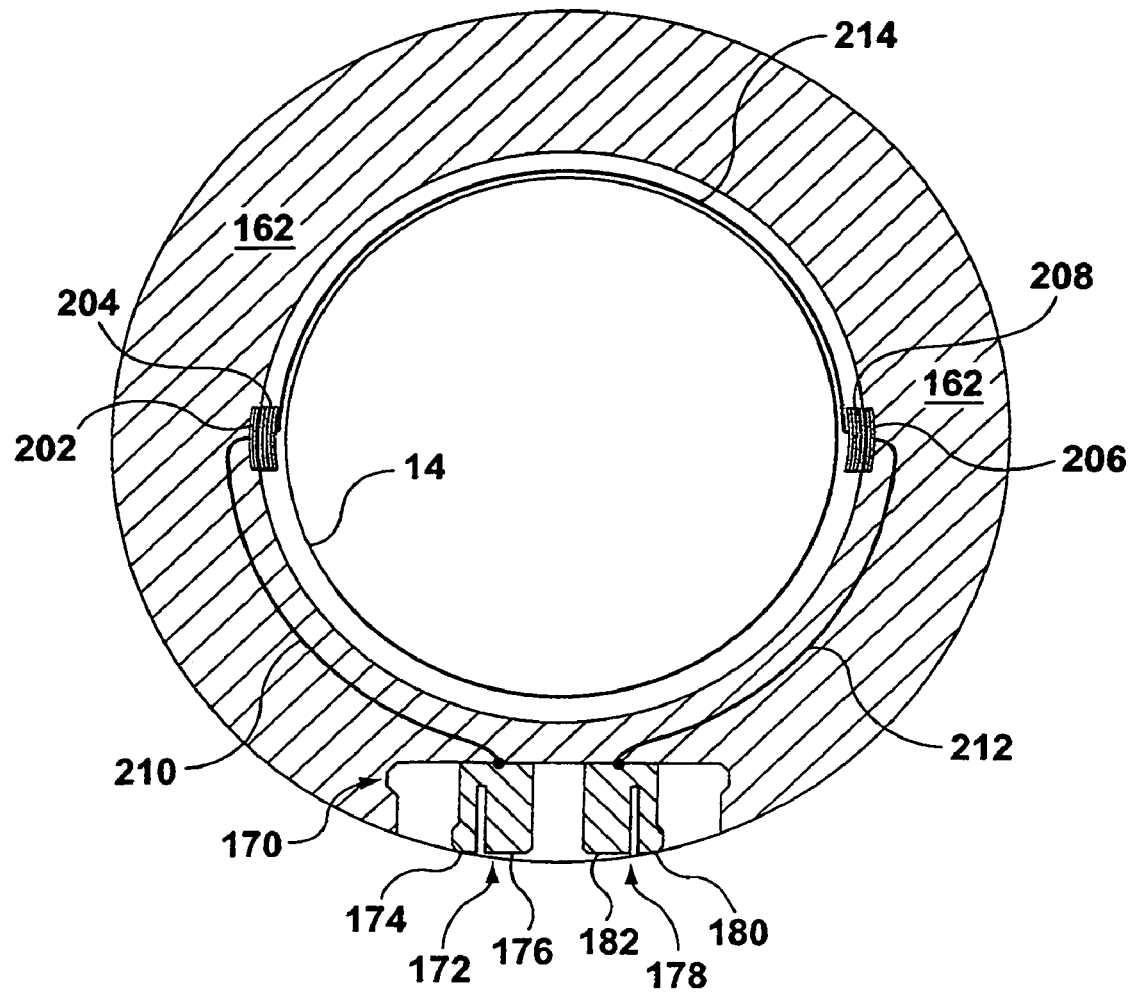
FIG. 24 is a cross-sectional view taken along Line 24-24 in FIG. 21 of the fourth embodiment of an electrical connector assembly for a cylindrical heater for an injection molding machine including an engagement receptacle.

Referring now to FIG. 24, which illustrates the engagement receptacle 170 for the connector assembly 162. The engagement receptacle 170 includes a first u-shaped engagement member 172 and a second u-shaped engagement member 178. The first u-shaped engagement member 172 includes a first portion 174 and a second portion 176 and the second u-shaped engagement member 178 includes a third portion 180 and a fourth portion 182.

Upon engagement, the first outer arm 186 and the first inner arm 190 of the removable engagement connector 164 can move together and engage the engagement receptacle 170 adjacent to the third portion 180. The third portion 180 and the fourth portion 182 of the engagement receptacle 170 can also move together under pressure. The middle arm 194 of the removable engagement connector 164 can be engaged between the second portion 176 and the fourth portion 182 of the engagement receptacle 170. The first portion 174 and the second portion 176 of the engagement receptacle 170 can also move together under pressure. Also, the second outer arm 188 and the second inner arm 192 of the removable engagement connector 164 can move together and engage the engagement receptacle 170 adjacent to the first portion 174. When the removable engagement connector 164 is engaged with the engagement receptacle 170, then optionally, an audible indication is provided, e.g., "snap."

The first u-shaped engagement member 172 is electrically connected via a fifth electrical conductor 210 to a first contact member 202. The first contact member 202 can electrically connect with a first conductive portion 204, e.g., film pad, on an arcuate portion of the cylindrical heater 14. The second u-shaped engagement member 178 is electrically connected via a sixth electrical conductor 212 to a second contact member 206. The second contact member 206 can electrically connect with a second conductive portion 208, e.g., film pad, on an arcuate portion of the cylindrical heater 14.

Therefore, as shown in FIGS. 23 and 24, when electrical power is applied to the first electrical conductor 166, it flows into the fourth electrical conductor 189 and into the second electrically conductive cavity 198 of the removable engagement connector 164. The electrical power goes from the second conductive cavity 198 into the first u-shaped engagement member 172 and then via the fifth electrical conductor 210 to the first contact member 202 to electrically connect with a first conductive portion 204, e.g., film pad, on an arcuate portion of the cylindrical heater 14. In the same manner, when electrical power is applied to the second electrical conductor 168, it flows into the third electrical conductor 187 and into the first electrically conductive cavity 196 of the removable engagement connector 164. The electrical power goes from the first conductive cavity 196 into the second u-shaped engagement member 178 and then via the sixth electrical conductor 212 to the second contact member 206 to electrically connect with a second conductive portion 208, e.g., film pad, on an arcuate portion of the cylindrical heater 14. There is an application of electrical energy to the first conductive portion 204 and the second conductive portion 208. There is at least one resistive trace 214 that is electrically connected between the first conductive portion 204 and the second conductive portion 208. When electrical power is applied to the first conductive portion 204 and the second conductive portion 208, it flows through the at least one resistive trace 214. This results in the generation of heat energy for the cylindrical heater 14. In a similar manner, a wide variety of interconnects can be utilized with the removable engagement connector 164 and engagement receptacle 170 can be utilized to achieve the same result and the invention should not be necessarily limited to male and female portions as well as the sequence of electrical interconnection between male and female type interconnections shown and described.

Figure 25:
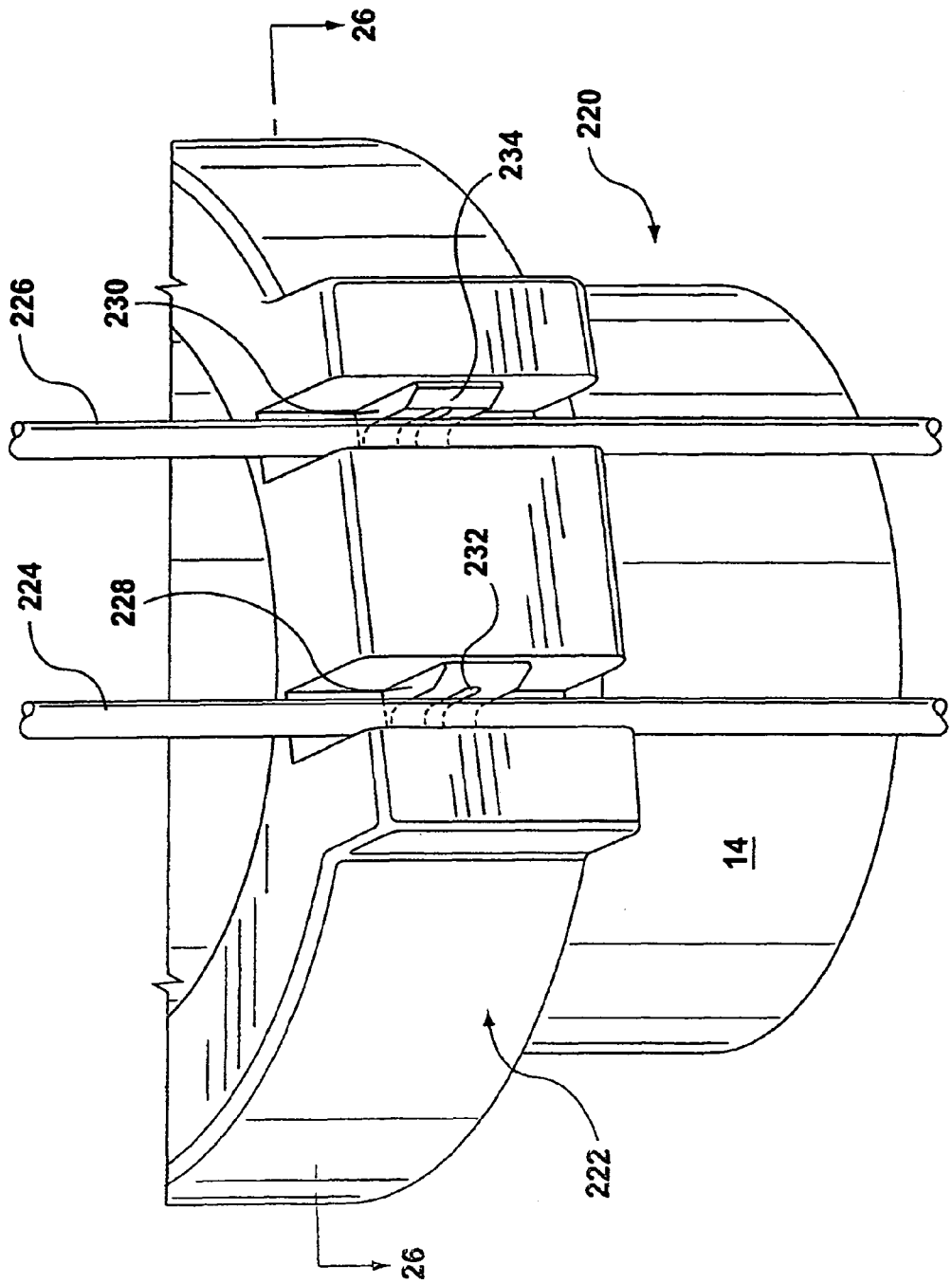
FIG. 25 is the perspective view for a fifth embodiment of an electrical connector assembly for a cylindrical heater for an injection molding machine with attached wiring.

Referring now to FIG. 25, a fifth embodiment is generally indicated by numeral 220. This includes a connector assembly that is generally indicated by numeral 222. An arcuate surface such as that provided by a cylindrical heater, as previously described, is indicated by numeral 14. There is a first electrical conductor 224 that is electrically connected to a first contact 228 and a second electrical conductor 226 that is electrically connected to a second contact 230. The first contact 228 and the second contact 230 are located within the connector assembly 222. The first contact 228 preferably includes at least one first slotted section 232 and the second contact 230 preferably includes at least one second slotted section 234. This same embodiment can be utilized to provide disconnect functionality to auxiliary devices such as, but not limited to, thermocouples, resistance temperature detector (RTD), or any of a wide variety of sensors.

In an illustrative, but nonlimiting example of the fifth embodiment, the first electrical conductor 224 and the second electrical conductor 226 are preferably insulated wires. An illustrative, but nonlimiting, example of insulated wires includes TEFLON® coated wiring. TEFLON® is a federally registered trademark of E. I. du Pont de Nemours and Company, having a place of business at 1007 Market Street, Wilmington, Del. 19898. The insulation from the first electrical conductor 224 is displaced when engaged by the at least one first slotted section 232 within the first contact 228 and the insulation from the second electrical conductor 226 is displaced when engaged by the at least one second slotted section 234 within the second contact 230. Preferably when the first electrical conductor 224 and the second electrical conductor 226 are energized, the materials in the first contact 228 and the second contact 230 expand and flex due to the at least one first slotted section 232 and at least one second slotted section 234, respectively. This expanding and flexing of the first contact 228 and the second contact 230 grips and secures the first electrical conductor 224 and the second electrical conductor 226, respectively.

Figure 26:
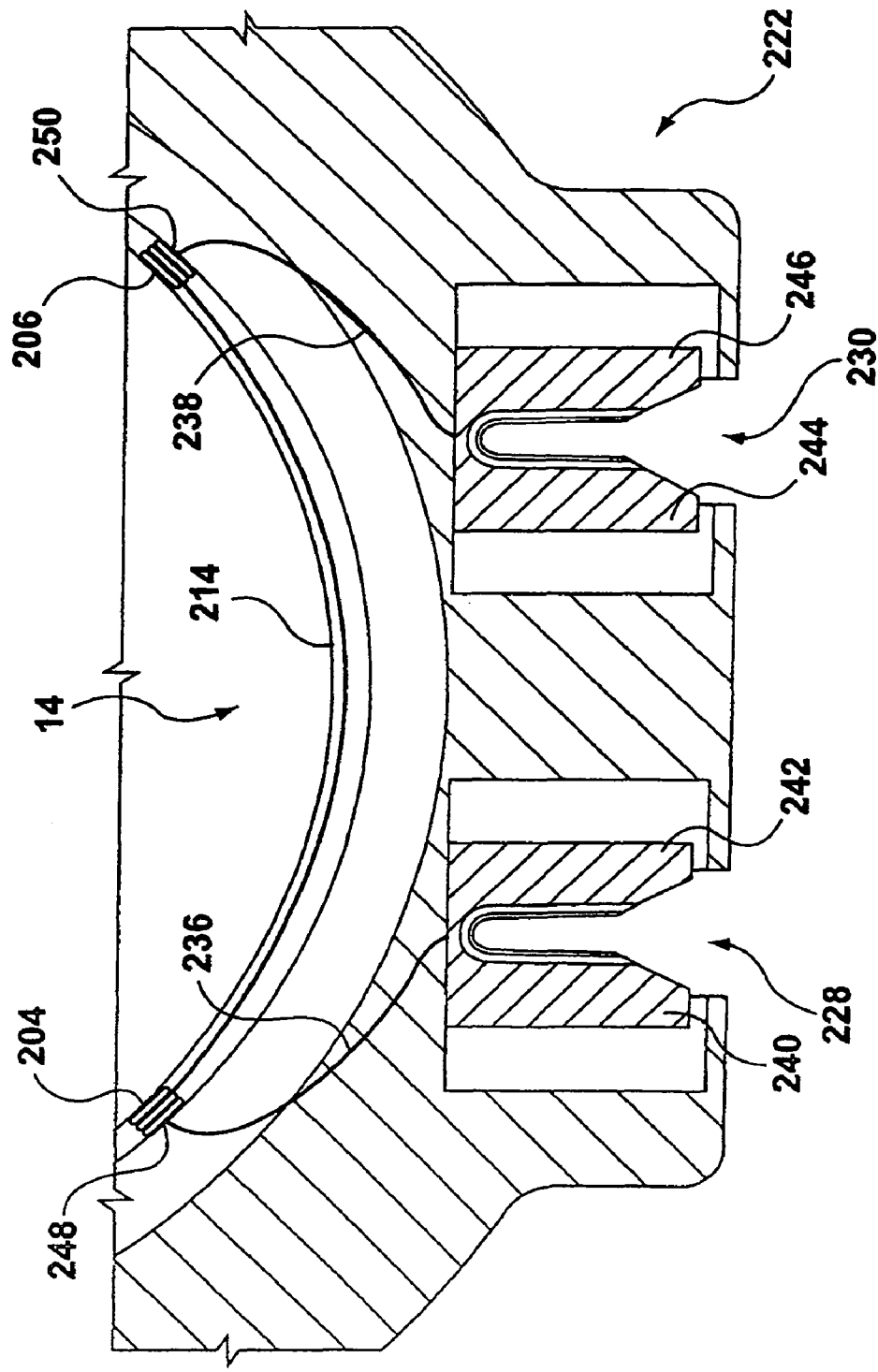
FIG. 26 is a cross-sectional view taken along Line 26-26 in FIG. 25 for the fifth embodiment of an electrical connector assembly for a cylindrical heater for an injection molding machine without attached wiring.

Referring now to FIG. 26, which illustrates the connector assembly 222. The first contact 228 includes a first portion 240 and a second portion 242, and the second contact 230 includes a third portion 244 and a fourth portion 246.

The first contact 228 is electrically connected via a third electrical conductor 236 to a first contact member 248. The first contact member 248 can electrically connect with a first conductive portion 204, e.g., film pad, on an arcuate portion of the cylindrical heater 14. The second contact 230 is electrically connected via a fourth electrical conductor 238 to a second contact member 250. The second contact member 250 can electrically connect with a second conductive portion 206, e.g., film pad, on an arcuate portion of the cylindrical heater 14.

Therefore, as shown in FIGS. 25 and 26, when electrical power is applied to the first electrical conductor 224, it flows into the first contact 228. The electrical power goes from the first contact 228 via the third electrical conductor 236 to the first contact member 248 to electrically connect with a first conductive portion 204, e.g., film pad, on an arcuate portion of the cylindrical heater 14. In the same manner, when electrical power is applied to the second electrical conductor 226, it flows into the second contact 230. The electrical power goes from the second contact 230 via the fourth electrical conductor 238 to the second contact member 250 to electrically connect with a second conductive portion 206, e.g., film pad, on an arcuate portion of the cylindrical heater 14.

There is an application of electrical energy to the first conductive portion 204 and the second conductive portion 206. Also, there is at least one resistive trace 214 that is electrically connected between the first conductive portion 204 and the second conductive portion 206. When power is applied to the first conductive portion 204 and the second conductive portion 206, it flows through the at least one resistive trace 214. This results in the generation of heat energy for the cylindrical heater 14.

Illustrative, but nonlimiting, examples of these types of materials that can be utilized for the first contact 228 and the second contact 230 include semi-elastic, spring-effect, bimetallic, and shape memory materials.

A first illustrative material includes bimetallic materials, e.g., bi-metal strips. Bi-metal strips are materials bonded to suitable backing material to achieve a significant change of shape when exposed to temperature. Illustrative, but nonlimiting, examples of the contact material can include a silver alloy, gold, platinum, and/or a copper/tungsten alloy, which is commercially known as CUWODUR® or a silver/tungsten carbide known as SIWODUR®. CUWODUR® and SIWODUR® are federally registered trademarks for electrical contact parts made of sintered materials, which are owned by Deduce GmbH, a German Corporation, having a place of business at Im Altgefall 12, D-75181 Pforzheim, Federal Republic of Germany. Illustrative, but nonlimiting, examples of the backing material include nickel or stainless-based materials (high temperature) with low thermal expansion.

A second illustrative material includes a spring-effect of the contact-holding power wires, can be accomplished with spring-loaded contact feature. Soft gold electroplate deposited on activated stainless steel will be standard material of choice for contact applications in temperature operating at 450 degrees Celsius (842 degrees Fahrenheit). Other possible contact systems may be based on beryllium copper contact materials that are gold-plated or a gold alloy clad system. An illustrative example includes specially formulated inlay material including WE#1™ inlay material or for higher temperature 62Au 21Pd 14Ag contact material may be used. These materials are available from Technical Materials, Inc. Technical Materials, Inc. has a place of business at 5 Wellington Road, Lincoln, R.I. 02865. 62Au 21Pd 14Ag is 62% by weight gold, 21% by weight palladium and 14% by weight silver.

A third illustrative material includes shape memory alloys. Shape memory alloys are alloys that are semi-elastic and change shape when a solid state phase change in the material occurs at a molecular level. This can include nickel alloys that will change shape at specific temperature, e.g., 150 degrees Celsius (302 degrees Fahrenheit). A change in material will occur at a trigger temperature. This is a transformation from Austenite to Martensite. This change will grip the first and second electrical conductors 224 and 226 and reduce electrical resistance of the first and second contacts 228 and 230, as shown in FIG. 25. When the temperature drops, the first and second contacts 228 and 230 will relax and reduce pressure on the first and second electrical conductors 224 and 226. There are semi-elastic inherent properties that may be used to supplement this inherent feature of the contact. These materials are also called "smart" materials because of these properties to return into original shape. This includes a NiTinol alloy of Nickel and Titanium is used as a shape memory alloy. An illustrative, but nonlimiting example of this type of material is Flexinol®. Flexinol® is a federally registered trademark of Dynalloy, Inc., having a place of business at 3194-A Airport Loop Drive, Costa Mesa, Calif. 92626.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "have," "having," "includes" and "including" and similar terms as used in the foregoing specification are used in the sense of "optional" or "may include" and not as "required." Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims that follow.

The invention claimed is:

1. A heater and nozzle assembly, comprising:
   at least one heater having an arcuate surface;
   at least one nozzle that is in thermal communication with the heater; and
   an electrical connector assembly for the heater, wherein the electrical connector assembly includes at least one electrical connector that includes a first electrical conductor that is electrically connectable to at least one first conductive portion on the heater and a second electrical conductor that is electrically connectable to at least one second conductive portion on the heater and the electrical connector assembly includes a disconnect mechanism positioned adjacent to the at least one electrical connector and in electrical connection with the first electrical conductor and the second electrical conductor,
   wherein:
   the disconnect mechanism includes at least one detachable electrical connector that can engage the first electrical conductor and provide electrical connection to a third electrical conductor and the at least one detachable electrical connector that can engage the second electrical conductor and provide electrical connection to a fourth electrical conductor.

2. The heater and nozzle assembly as set forth in claim 1, wherein:
   the at least one first conductive portion includes at least one film pad and the at least one second conductive portion includes at least one second film pad.

3. The heater and nozzle assembly as set forth in claim 1, wherein:
   the electrical connector assembly includes material selected from the group consisting of ceramics, glass, high temperature filled thermosets, high temperature thermosets and metal.

4. The heater and nozzle assembly as set forth in claim 1, wherein:
the disconnect mechanism is selected from the group consisting of at least one female connector and at least one male connector.

5. The heater and nozzle assembly as set forth in claim 1, wherein:
the at least one detachable electrical connector includes a receptacle and the at least one electrical connector includes a jack that is electrically connected to the first electrical conductor and the second electrical conductor.

6. The heater and nozzle assembly as set forth in claim 1, wherein:
the at least one at one electrical connector includes at least one first contact blade that can be selectively positioned adjacent to the at least one first conductive portion on the heater and in electrical connection therewith and at least one second contact blade that can be positioned adjacent to the at least one second conductive portion on the heater and in electrical connection therewith and the at least one first contact blade is electrically connected to the first electrical conductor and the at least one second contact blade is electrically connected to the second electrical conductor.

7. The heater and nozzle assembly as set forth in claim 6, wherein:
the at least one electrical connector can be axially rotated so the at least one first contact blade can be selectively positioned adjacent to the at least one first conductive portion on the heater and in electrical connection therewith and the at least one second contact blade can be positioned adjacent to the at least one second conductive portion on the heater and in electrical connection therewith and secured into a fixed position.

8. The heater and nozzle assembly as set forth in claim 6, wherein:
the at least one first contact blade and the at least one second contact blade are mounted within a housing.

9. The heater and nozzle assembly as set forth in claim 8, wherein:
the housing includes a plurality of rings.

10. The heater and nozzle assembly as set forth in claim 9, wherein:
the plurality of rings includes a top ring being top positioned over an upper ring, a middle ring positioned under the upper ring and a lower ring positioned under the middle ring.

11. The heater and nozzle assembly as set forth in claim 10, wherein:
the lower ring includes a first indentation for receiving the at least one first contact blade and a second indentation for receiving the at least one second contact blade, the middle ring includes a third indentation for receiving the at least one first contact blade and a fourth indentation for receiving the at least one second contact blade, the top ring includes a fifth indentation for receiving the at least one first contact blade and a sixth indentation for receiving the at least one second contact blade, wherein there is a first opening in the lower ring and the middle ring that provides contact between the at least one first contact blade and the at least one first conductive portion and a second opening in the lower ring and the middle ring that provides contact between the at least one second contact blade and the at least one second conductive portion.

12. The heater and nozzle assembly as set forth in claim 10, wherein;
the upper ring includes at least one first opening for allowing passage of the first electrical conductor and the second electrical conductor and the top ring includes at least one second opening for allowing passage of the first electrical conductor and the second electrical conductor, wherein the at least one first contact blade is electrically connected to the first electrical conductor and the at least one second contact blade is electrically connected to the second electrical conductor.

13. The heater and nozzle assembly as set forth in claim 1, wherein:
the electrical connector assembly includes a plurality of electrical connector assemblies each having at least one first contact blade that can be selectively positioned adjacent to the at least one first conductive portion on the arcuate surface and in electrical connection therewith and the plurality of electrical connector assemblies each having at least one second contact blade that can be positioned adjacent to the at least one second conductive portion on the arcuate surface and in electrical connection therewith.

14. The heater and nozzle assembly as set forth in claim 13, further comprising:
at least one electrical jumper assembly that provides electrical power to the at least one first contact blade through the first electrical conductor and provides electrical power to the at least one second contact blades through the second electrical conductor.

15. The heater and nozzle assembly as set forth in claim 14, further comprising:
a plurality of electrical interconnections between a plurality of electrical connectors that are housed within the at least one electrical jumper assembly and the plurality of electrical connector assemblies, wherein the first electrical conductor is connected to a first power inlet and the second electrical conductor is connected to a second power inlet.

16. The heater and nozzle assembly as set forth in claim 1, wherein:
the disconnect mechanism includes a receptacle that is electrically connected through the first electrical conductor to the at least one first conductive portion on the arcuate surface and is electrically connected through the second electrical conductor to the at least one second conductive portion on the arcuate surface and the disconnect mechanism includes an engagement member that is electrically connected to the third electrical conductor and the fourth electrical conductor, wherein the engagement member and the receptacle are selectively engageable to provide electrical power to the at least one first conductive portion on the arcuate surface and electrical power to the at least one second conductive portion on the arcuate surface.

17. The heater and nozzle assembly as set forth in claim 16, wherein:
the engagement member includes a plurality of arms and the receptacle includes a plurality of u-shaped engagement members.

18. The heater and nozzle assembly as set forth in claim 17, wherein:
the engagement member includes a first outer arm, a first inner arm, a second outer arm, a second inner arm and a middle arm located between the first inner arm and the second inner arm and forming a first cavity between the first inner arm and the middle arm and a second cavity between the second inner arm and the middle arm.

19. The heater and nozzle assembly as set forth in claim 16, wherein:
the engagement member includes a removal feature to apply pressure to facilitate removal.

20. The heater and nozzle assembly as set forth in claim 16, wherein:
the engagement member provides an audible indication of engagement.

21. The heater and nozzle assembly as set forth in claim 1, wherein:
the disconnect mechanism includes a first contact for selective engagement of the first electrical conductor and a second contact for selective engagement of the second electrical conductor.

22. The heater and nozzle assembly as set forth in claim 21, wherein:
the first contact includes at least one first slotted section and the second contact includes at least one second first slotted section.

23. The heater and nozzle assembly as set forth in claim 1, wherein:
the disconnect mechanism includes a first contact for selective engagement with the first electrical conductor, wherein the first electrical conductor includes a first insulated wire and the first contact is capable of removing insulation at a position where the first electrical conductor is adjacent to the first contact and the disconnect mechanism includes a second contact for selective engagement with the second electrical conductor, wherein the second electrical conductor includes a second insulated wire and the first contact is capable of removing the insulation at a position where the second electrical conductor is adjacent to the second contact.

24. The heater and nozzle assembly as set forth in claim 21, wherein:
the first contact includes a first portion and a second portion, wherein the first portion and the second portion can grip the first electrical conductor when the first contact is heated and the second portion includes a third portion and a fourth portion, wherein the third portion and the fourth portion can grip the second electrical conductor when the second contact is heated.

25. The heater and nozzle assembly as set forth in claim 22, wherein:
the first contact and the second contact includes materials selected from the group consisting of semi-elastic materials, bimetallic materials, spring-effect materials or shape memory alloys.

26. A method for providing a disconnectable electrical connection for at least one heater, having an arcuate surface, and at least one nozzle comprising:
providing disconnect mechanism positioned adjacent to at least one electrical connector, wherein the at least one electrical connector includes a first electrical conductor that is electrically connectable to at least one first conductive portion on the at least one heater, wherein the at least one heater is in thermal communication with a nozzle, and a second electrical conductor that is electrically connectable to at least one second conductive portion on the at least one heater;
selectively positioning at least one first contact blade, of the at least one electrical connector, adjacent to the at least one first conductive portion on a heater and in electrical connection therewith, and the at least one first contact blade is electrical connection to the first electrical conductor; and
selectively positioning at least one first contact blade, of the at least one electrical connector, adjacent to the at least one second conductive portion on a heater and in electrical connection therewith and the at least one second contact blade is electrical connection to the second electrical conductor.

27. The method according to claim 26, wherein:
the at least one first conductive portion includes at least one film pad and the at least one second conductive portion includes at least one second film pad, wherein the disconnect mechanism includes at least one detachable electrical connector that can engage the first electrical conductor and provide electrical connection to a third electrical conductor and the at least one detachable electrical connector that can engage the second electrical conductor and provide electrical connection to a fourth electrical conductor.

28. The method according to claim 27, wherein:
the disconnect mechanism is selected from the group consisting of at least one female connector and at least one male connector.

29. The method according to claim 26, further comprising:
axially rotating the at least one electrical connector so the at least one first contact blade can be selectively positioned adjacent to the at least one first conductive portion on the at least one heater and in electrical connection therewith and the at least one second contact blade can be positioned adjacent to the at least one second conductive portion on the at least one heater and in electrical connection therewith; and
securing the at least one electrical connector into a fixed position.

30. The method according to claim 26, further comprising:
mounting the at least one first contact blade and the at least one second contact blade within a housing.

31. The method according to claim 30, wherein:
the housing includes a plurality of rings with at least top ring being top positioned over at least one upper ring, at least one middle ring positioned under the at least one upper ring and at least one lower ring positioned under the at least one middle ring.

32. The method according to claim 31, wherein:
the at least one upper ring includes at least one first opening for allowing passage of the first electrical conductor and the second electrical conductor and the at least one top ring includes at least one second opening for allowing passage of the first electrical conductor and the second electrical conductor, wherein the at least one first contact blade is electrically connected to the first electrical conductor and the at least one second contact blade is electrically connected to the second electrical conductor.

33. The method according to claim 26, further comprising:
utilizing a plurality of connector assemblies each selectively positioning at least one first contact blade, of the at least one electrical connector, adjacent to the at least one first conductive portion on the at least one heater and in electrical connection therewith and the at least one first contact blade is electrically connected to the first electrical conductor and wherein the plurality of connector assemblies each selectively positioning at least one second contact blade, of the at least one electrical connector, adjacent to the at least one second conductive portion on the at least one heater and in electrical connection therewith and the at least one second contact blade is electrically connected to the second electrical conductor.

34. The method according to claim 26, further comprising:

providing at least one electrical jumper assembly that provides electrical power to the at least one first contact blade through the first electrical conductor and provides electrical power to the at least one second contact blade through the second electrical conductor; and providing a plurality of electrical interconnections between a plurality of electrical connectors that are housed within the at least one electrical jumper assembly and the at least one electrical connector, wherein the first electrical conductor is connected to a first power inlet and the second electrical conductor is connected to a second power inlet.

35. The method according to claim 27, wherein:

the disconnect mechanism includes a receptacle that is electrically connected through the first electrical conductor to the at least one first conductive portion on the at least one heater and is electrically connected through the second electrical conductor to the at least one second conductive portion on the at least one heater and the disconnect mechanism includes an engagement member that is electrically connected to the third electrical conductor and the fourth electrical conductor, wherein the engagement member and the receptacle are selectively engageable to provide electrical power to the at least one first conductive portion on the at least one heater and electrical power to the at least one second conductive portion on the heater.

36. The method according to claim 27, wherein:

the disconnect mechanism includes a first contact for selective engagement of the first electrical conductor and a second contact for selective engagement of the second electrical conductor.

37. The method according to claim 36, wherein:

the first contact includes at least one first slotted section and the second contact includes at least one second first slotted section.

38. The method according to claim 27, wherein:

the disconnect mechanism includes a first contact for selective engagement with the first electrical conductor, wherein the first electrical conductor includes a first insulated wire and the first contact is capable of removing insulation at a position where the first electrical conductor is adjacent to the first contact and the disconnect mechanism includes a second contact for selective engagement with the second electrical conductor, wherein the second electrical conductor includes a second insulated wire and the first contact is capable of removing the insulation at a position where the second electrical conductor is adjacent to the second contact.

39. The method according to claim 36, further comprising:

gripping the first electrical conductor when the first contact is heated, wherein the first contact includes a first portion and a second portion; and gripping the second electrical conductor when the second contact is heated, wherein the second contact includes a third portion and a fourth portion.

* * * * *